(12) United States Patent
Lee et al.

(10) Patent No.: US 12,501,183 B2
(45) Date of Patent: Dec. 16, 2025

(54) IMAGE SENSOR AND OPERATING METHOD OF IMAGE SENSOR

(71) Applicant: SAMSUNG ELECTRONICS CO., LTD., Suwon-si (KR)

(72) Inventors: Jeongguk Lee, Suwon-si (KR); Seongwook Song, Suwon-si (KR); Geunyoung Lee, Suwon-si (KR); Haewoong Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 18/386,061

(22) Filed: Nov. 1, 2023

(65) Prior Publication Data

US 2024/0196111 A1    Jun. 13, 2024

(30) Foreign Application Priority Data

Dec. 9, 2022  (KR) ..................... 10-2022-0171869
Apr. 26, 2023  (KR) ..................... 10-2023-0054970

(51) Int. Cl.
  *H04N 25/633*    (2023.01)
  *H04N 25/78*     (2023.01)

(52) U.S. Cl.
  CPC .......... *H04N 25/633* (2023.01); *H04N 25/78* (2023.01)

(58) Field of Classification Search
  None
  See application file for complete search history.

(56) References Cited

U.S. PATENT DOCUMENTS

| | | |
|---|---|---|
| 7,102,672 B1 | 9/2006 | Jacobs |
| 7,187,409 B2 | 3/2007 | Nakahira et al. |
| 7,463,294 B2 | 12/2008 | Tsuda |
| 8,634,003 B2 | 1/2014 | Watanabe |
| 8,792,020 B2 | 7/2014 | Lee et al. |
| 9,349,762 B2 | 5/2016 | Cho et al. |
| 9,392,203 B2 | 7/2016 | Oh et al. |
| 9,560,294 B2 | 1/2017 | Beck et al. |
| 10,791,288 B2 | 9/2020 | Ichikawa et al. |
| 11,418,738 B2 | 8/2022 | Duan et al. |
| 2005/0083419 A1 | 4/2005 | Honda et al. |
| 2008/0170228 A1 | 7/2008 | Jiang |

(Continued)

FOREIGN PATENT DOCUMENTS

| | | | |
|---|---|---|---|
| JP | 4926654 B2 | 5/2012 | |
| JP | 6028363 B2 | 11/2016 | |

*Primary Examiner* — Mark T Monk
(74) *Attorney, Agent, or Firm* — Sughrue Mion, PLLC

(57) ABSTRACT

An image sensor includes an active pixel array in which a plurality of active pixels are arranged in a matrix, the active pixel array including a plurality of active regions including at least one active pixel, an optical black pixel array in which a plurality of optical black pixels are arranged in a matrix, the optical black pixel array including a plurality of optical black regions including at least one optical black pixel, a readout circuit configured to generate image data including pixel values by converting pixel signals generated from the plurality of active pixels into digital signals and generate black data including black pixel values by converting black signals generated from the plurality of optical black pixels into digital signals, and a dark level corrector configured to correct pixel values included in the image data.

20 Claims, 16 Drawing Sheets

(56) References Cited

U.S. PATENT DOCUMENTS

| | | | |
|---|---|---|---|
| 2010/0182451 A1* | 7/2010 | Kita | H04N 25/587 348/E5.037 |
| 2012/0133803 A1* | 5/2012 | Lee | H04N 25/633 348/E9.037 |
| 2022/0210398 A1 | 6/2022 | Lee | |

* cited by examiner

FIG. 6

|   | rv1 | rv2 | rv3 | rv4 | rv5 | rv6 | rv7 | rv8 | rv9 | rv10 | dd1 |
|---|---|---|---|---|---|---|---|---|---|---|---|
|   | 80 | 90 | 80 | 70 | 60 | 50 | 40 | 30 | 20 | 10 |   |
| 5 | 41.6 | 52.7 | 58.7 | 55 | 49.1 | 42 | 34.4 | 26.5 | 18.6 | 11.1 | 5 |
| 5 | 26.6 | 38 | 42.6 | 42.3 | 39.3 | 34.7 | 29.1 | 23 | 16.7 | 10.7 | 5 |
| 5 | 17.6 | 26.6 | 31.3 | 32.5 | 31.2 | 28.2 | 24.3 | 19.7 | 14.8 | 9.83 | 5 |
| 5 | 13.2 | 19.6 | 23.5 | 25 | 24.7 | 22.9 | 20.1 | 16.6 | 12.8 | 8.89 | 5 |
| 5 | 10.5 | 15 | 18 | 19.5 | 19.6 | 18.5 | 16.5 | 13.9 | 11 | 7.93 | 5 |
| 5 | 8.74 | 11.9 | 14.2 | 15.4 | 15.6 | 15 | 13.6 | 11.6 | 9.3 | 6.82 | 5 |
| 5 | 7.54 | 9.76 | 11.4 | 12.3 | 12.6 | 12.1 | 11.2 | 9.7 | 7.77 | 5.96 | 0 |
| 5 | 6.89 | 8.17 | 9.29 | 9.96 | 10.2 | 9.9 | 9.24 | 8.25 | 7 | 5.66 | 5 |
| 5 | 6.03 | 6.94 | 7.64 | 8.07 | 8.21 | 8.06 | 7.66 | 7.06 | 6.32 | 5.57 | 5 |
| 5 | 5.49 | 5.92 | 6.26 | 6.46 | 6.53 | 6.47 | 6.28 | 6 | 5.66 | 5.31 | 5 |
|   | 5 | 5 | 5 | 5 | 5 | 5 | 5 | 5 | 5 | 5 |   | rv11 rv12

IMAGE SENSOR AND OPERATING METHOD OF IMAGE SENSOR

CROSS-REFERENCE TO RELATED APPLICATION

This application is based on and claims priority to Korean Patent Application No. 10-2023-0054970, filed on Apr. 26, 2023, in the Korean Intellectual Property Office, and Korean Patent Application No. 10-2022-0171869, filed on Dec. 9, 2022, in the Korean Intellectual Property Office, the disclosures of which are incorporated by reference herein in their entireties.

BACKGROUND

Example embodiments of the disclosure relate to an image sensor, and more particularly, to an image sensor for correcting dark shading of an active pixel based on black pixel values of optical black pixels included in an optical black region.

An image sensor may be a device configured to capture a two-dimensional or three-dimensional image of an object. An image sensor may generate an image of an object using a photoelectric conversion element that reacts according to the intensity of light reflected from the object.

In the image sensor, the photoelectric conversion element may output a signal including a light component and a dark current component. The dark current may refer to a current generated in a photoelectric conversion element of pixels in a state in which there is no incident light, and the dark current may be dependent on temperature.

Charges accumulated due to the dark current of each pixel may generate a dark level of a pixel signal voltage. The dark level of a pixel signal voltage may cause dark shading, which may degrade the quality of an image.

Accordingly, a technique for improving image quality by correcting dark shading is required.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide an image sensor for improving the quality of an image generated from the image sensor by estimating and correcting a dark level of active pixels using a heat transfer model generated based on a black pixel value generated from optical black pixels included in an optical black region, and an operating method thereof.

Additional aspects will be set forth in part in the description which follows and, in part, will be apparent from the description, or may be learned by practice of the presented embodiments.

According to an aspect of an example embodiment, an image sensor may include an active pixel array in which a plurality of active pixels are arranged in a matrix, the active pixel array including a plurality of active regions including at least one active pixel, an optical black pixel array in which a plurality of optical black pixels are arranged in a matrix, the optical black pixel array including a plurality of optical black regions including at least one optical black pixel, a readout circuit configured to generate image data including pixel values by converting pixel signals generated from the plurality of active pixels into digital signals and generate black data including black pixel values by converting black signals generated from the plurality of optical black pixels into digital signals, and a dark level corrector configured to correct pixel values included in the image data corresponding to each of a plurality of frames on a frame-by-frame basis based on black pixel values included in the black data of optical black pixels that correspond to each of the plurality of frames and that are included in the plurality of optical black regions.

According to an aspect of an example embodiment, an image sensor may include an active pixel array including a plurality of active pixels, an optical black pixel array including a plurality of optical black pixels, a readout circuit configured to generate pixel values corresponding to a first frame by converting pixel signals generated from the plurality of active pixels into digital signals and generate black pixel values corresponding to the first frame by converting black signals generated from the plurality of optical black pixels into digital signals, an estimator configured to estimate dark level values included in the pixel values corresponding to the first frame using a heat transfer model generated based on the black pixel values and generate first dark data based on the estimated dark level values, a dark level generator configured to generate a final dark level value based on at least one of the first dark data and second dark data indicating a dark level value included in a pixel value at a specific temperature, and a correction value generator configured to generate a correction value based on the final dark level value and correct the pixel values corresponding to the first frame based on the correction value.

According to an aspect of an example embodiment, a method of operating an image sensor including a plurality of active pixels and a plurality of optical black pixels may include generating pixel values corresponding to a first frame by converting pixel signals generated from the plurality of active pixels into digital signals, generating black pixel values corresponding to the first frame by converting black signals generated from the plurality of optical black pixels into digital signals, estimating dark level values of the pixel values corresponding to the first frame using a heat transfer model generated based on the black pixel values, generating first dark data based on the estimated dark level values, generating a final dark level value of the pixel values corresponding to the first frame based on at least one of the first dark data and second dark data indicating a dark level value included in image data at a specific temperature, generating a correction value based on the final dark level value and correcting the pixel values corresponding to the first frame based on the correction value.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 6 is a diagram illustrating first dark data according to an embodiment;

DETAILED DESCRIPTION

Figure 1:
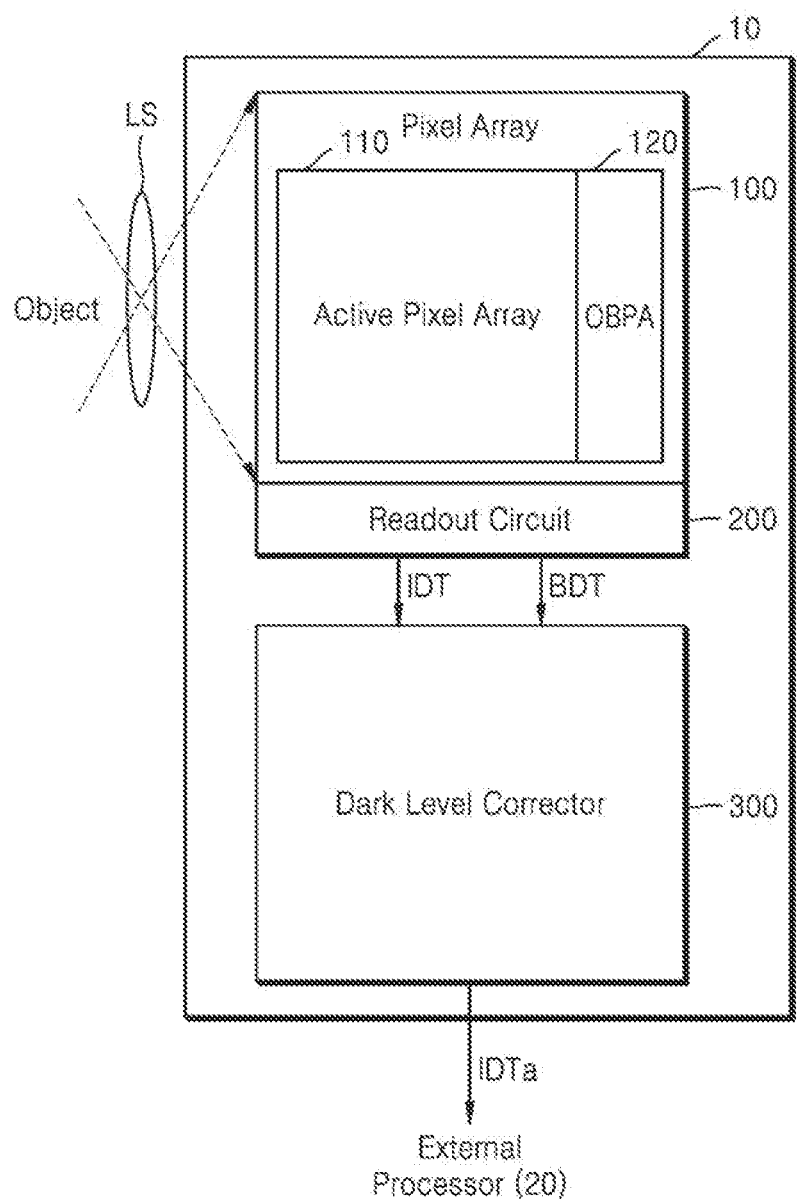
FIG. 1 is a block diagram illustrating an image sensor according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating an image sensor 10 according to an embodiment.

The image sensor 10 may convert an optical signal of an object incident through an optical lens LS into image data. The image sensor 10 may be mounted in an electronic device having an image or light sensing function. For example, the image sensor 10 may be implemented as a personal computer (PC), an Internet of Things (IoT) device, or a portable electronic device. A portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like. In addition, the image sensor 10 may be mounted on electronic devices such as drones and advanced driver assistance systems (ADAS), or electronic devices provided as components in vehicles, furniture, manufacturing facilities, doors, and various measuring devices.

Referring to FIG. 1, the image sensor 10 may include a pixel array 100, a readout circuit 200, and a dark level corrector 300. The image sensor 10 may include additional components, such as a memory and an interface circuit other than the pixel array 100, readout circuit 200, and dark level corrector 300 shown in FIG. 1.

The pixel array 100 may include a plurality of row lines, a plurality of column lines, and a plurality of pixels arranged in a matrix form and each connected to a row line and a column line. The row line may include a plurality of lines for transmitting row selection signals and pixel control signals to connected pixels.

The pixel array 100 may include an active pixel array 110 in which a plurality of active pixels are arranged in a matrix and an optical black pixel array 120 (shown as OBPA) in which a plurality of optical black pixels are arranged in a matrix.

Each of the plurality of active pixels of the active pixel array 110 may include a photoelectric conversion element, may sense light using the photoelectric conversion element, and may convert the detected light into a pixel signal that is an electrical signal. The photoelectric conversion element may be implemented as a photoelectric conversion element such as a charge coupled device (CCD) or complementary metal oxide semiconductor (CMOS), and may be implemented as various types of photoelectric conversion elements.

The active pixel array 110 may include a plurality of active pixels each converting a received optical signal (light) into an electrical signal, and the plurality of active pixels may be arranged in a matrix. Each of the plurality of active pixels may include a photoelectric conversion element. For example, a photoelectric conversion element may be a photoelectric conversion element including an organic material or an inorganic material, such as an inorganic photodiode, an organic photodiode, a perovskite photodiode, a phototransistor, a photogate, or a pinned photodiode. In an embodiment, each of the plurality of active pixels may include a plurality of photoelectric conversion elements.

In addition, a micro-lens for focusing light may be disposed above each of a plurality of active pixels or above each of pixel groups composed of adjacent active pixels. Each of the plurality of active pixels may sense light in a specific spectral range from light received through the micro-lens. For example, the active pixel array 110 may include a red pixel for converting light in a red spectrum region into an electrical signal, a green pixel for converting light in a green spectrum region into an electrical signal, and a blue pixel for converting light in the spectral domain into an electrical signal. However, the present embodiment is not limited thereto, and the active pixel array 110 may include pixels that convert light of a spectrum region other than red, green, and blue into electrical signals. For example, the active pixel array 110 may include pixels that convert light in a cyan, yellow, and magenta spectrum region into an electrical signal.

The active pixel array 110 may include a plurality of row lines, a plurality of column lines, a plurality of active pixels each connected to the row lines and the column lines and disposed in a matrix form, and a color filter array arranged to correspond to each of the plurality of active pixels. A color filter array for transmitting light in a specific spectral range may be disposed above each of the plurality of active pixels. For example, the color filter array may have a configuration in which cells having a 2×2 size and that include a red color pixel, a blue color pixel, and two green color pixels are repeatedly disposed. Such a pattern may be referred to as a Bayer pattern.

In some embodiments, the plurality of active pixels may have a multi-layer structure. An active pixel having a multi-layer structure may include a plurality of stacked photoelectric conversion elements that convert light in different spectral ranges into electrical signals, and electrical signals corresponding to different colors may be generated from the plurality of photoelectric conversion elements. In other words, electrical signals corresponding to a plurality of colors may be output from one active pixel.

The optical black pixel array 120 may include a plurality of optical black pixels. An upper part of each of the plurality of optical black pixels of the optical black pixel array 120 may be covered with a metal, and thus, light incident from the outside may be blocked. Because most of light incident from the outside may be blocked by the metal, the optical black pixel array 120 may be marginally affected by the incident light. Each of the optical black pixels may not perform photoelectric conversion. Each of the plurality of optical black pixels may output a black signal based on electrons generated inside each of the plurality of optical black pixels.

In an embodiment, the optical black pixels of the optical black pixel array 120 may have substantially the same structure as each of the active pixels included in the active pixel array 110, except for a structure in which light incident from the outside is blocked by a metal.

The readout circuit 200 may receive a pixel signal that is an electrical signal from the pixel array 100 and convert the pixel signal into image data IDT including pixel values of each of the plurality of pixels PX. Specifically, the readout circuit 200 may receive pixel signals from the plurality of active pixels of the active pixel array 110 and generate image data IDT by converting the pixel signals into digital signals.

The image data IDT may be a signal in the form of a stream including a pixel value that is a digital value corresponding to each active pixel of the active pixel array 110. The image data IDT may include pixel values corresponding to each of a plurality of frames. The pixel values corresponding to the frame may refer to pixel values constituting the frame. For example, pixel values corresponding to the first frame may refer to pixel values constituting the first frame. A pixel value corresponding to a frame may be referred to herein as a pixel value of a frame.

The pixel signal may include a reset signal or an image signal (or sensing signal). The readout circuit 200 may generate and output pixel values corresponding to the plurality of active pixels by converting reset signals and image signals received from the active pixel array 110 into digital signals.

The pixel signal may include a signal including a dark current component. The dark current may denote a current generated in a photoelectric conversion element of pixels in a state in which there is no incident light, and is dependent on temperature. The pixel value may include a dark level value due to a signal including a dark current component. The pixel values of active pixels may include a dark level value. A dark level value included in a pixel value may cause dark shading, which may degrade image quality, and thus, the dark level value may need to be accurately estimated and corrected.

The readout circuit 200 may receive a black signal that is an electrical signal from the pixel array 100 and convert the black signal into black data BDT including black pixel values of each of the plurality of pixels PX. Specifically, the readout circuit 200 may receive a black signal from a plurality of optical black pixels of the optical black pixel array 120 and generate black data BDT by converting the black signal into a digital signal.

The black data BDT may be a signal in the form of a stream including a black pixel value that is a digital value corresponding to each optical black pixel of the optical black pixel array 120. The black data BDT may include black pixel values corresponding to each of the plurality of frames. The black pixel values corresponding to a frame may denote black pixel values generated from optical black pixels when a pixel value corresponding to one frame is generated. A black pixel value corresponding to a frame may be referred to herein as a black pixel value of a frame.

The readout circuit 200 may transfer the image data IDT to the dark level corrector 300. The readout circuit 200 may transmit the black data BDT to the dark level corrector 300.

The dark level corrector 300 may receive the image data IDT. The dark level corrector 300 may perform a dark level correction operation on the image data IDT. The dark level correction operation may refer to an operation of estimating a dark level value included in the image data IDT and correcting of the dark level value. The dark level corrector 300 may receive black data BDT. The dark level corrector 300 may perform a dark level correction operation on the image data IDT based on the black data BDT.

The dark level corrector 300 may perform dark level correction on the image data IDT in frame units. In an embodiment, the dark level corrector 300 may correct pixel values included in the image data IDT in frame units based on black pixel values of optical black pixels included in a plurality of optical black regions. The optical black pixel array 120 may include a plurality of optical black regions, and each of the plurality of optical black regions may include at least one optical black pixel. All regions of the optical black pixel array 120 may be divided into a plurality of optical black regions, or some regions of the optical black pixel array 120 may be divided into a plurality of optical black regions.

The dark level corrector 300 may correct pixel values corresponding to each of a plurality of frames based on black pixel values of optical black pixels that correspond to each of the plurality of frames and that are included in a plurality of optical black regions. That is, the dark level corrector 300 may correct pixel values corresponding to each of the plurality of frames, in frame units, based on black pixel values of the optical black region corresponding to each of the plurality of frames. For example, the dark level corrector 300 may correct pixel values corresponding to the first frame based on black pixel values of optical black pixels that correspond to the first frame and that are included in a plurality of optical black regions.

The dark level corrector 300 may estimate dark level values of active pixels included in a plurality of active regions based on black pixel values of optical black pixels included in a plurality of optical black regions. The active pixel array 110 may include a plurality of active regions, and each of the plurality of active regions may include at least one active pixel. The active pixel array 110 and the optical black pixel array 120 will be described in detail with reference to FIG. 3A.

The dark level corrector 300 may correct pixel values corresponding to each of a plurality of frames using a heat transfer model. The heat transfer model may refer to a model for estimating a dark level value of an active pixel by reflecting deterioration due to temperature. The dark level corrector 300 may correct pixel values corresponding to each of a plurality of frames using a heat transfer model that is generated based on black pixel values of optical black pixels included in a plurality of optical black regions.

In an embodiment, the dark level corrector 300 may estimate a dark level value of each of a plurality of active regions using a heat transfer model generated based on black pixel values of a plurality of optical black regions and generate first dark data based on the estimated dark level value. The first dark data may include a dark level value of each of the plurality of active regions. The dark level corrector 300 may correct image data including pixel values based on the first dark data. For example, the dark level corrector 300 may generate first dark data corresponding to the first frame using a heat transfer model generated based on black pixel values of a plurality of optical black regions. The dark level corrector 300 may generate first dark data corresponding to the second frame using a heat transfer model generated based on black pixel values of a plurality of optical black regions.

The dark level corrector 300 may estimate dark level values of active pixels included in each active region. For example, the dark level corrector 300 may estimate a dark level value included in each pixel value of active pixels included in the same active region as the same value. For example, the dark level corrector 300 may estimate the dark level value of each of the active pixels included in the first active region as the first dark level value and estimate the dark level value of each of the active pixels included in the second active region as the second dark level value.

In an embodiment, the dark level corrector 300 may generate first dark data using a heat transfer model generated based on black pixel values and temperature data of optical black pixels included in a plurality of optical black regions. The temperature data may be a value obtained by measuring the temperature of at least a partial region of the image sensor 10, may be a temperature of the entire image sensor 10 or may be a temperature for each of a plurality of regions of the image sensor 10. For example, the temperature data may be temperatures for each of a plurality of temperature regions included in the active pixel array 110. For example, the dark level corrector 300 may change an initial condition of a heat transfer model generated based on the temperature data and generate first dark data using the heat transfer model generated based on black pixel values of a plurality of optical black regions. The dark level corrector 300 may correct image data including pixel values based on the first dark data.

In an embodiment, the dark level corrector 300 may generate a final dark level value of each of the plurality of active regions based on the first dark data and the second dark data. The second dark data may indicate a dark level value included in the image data IDT at a specific temperature and may be referred to as calibration information. The second dark data may be received from external sources or may be pre-stored in an internal memory of the image sensor 10. The dark level corrector 300 may correct the image data IDT based on the final dark level value and generate corrected image data IDTa. For example, the dark level corrector 300 may correct pixel values corresponding to the first frame based on the final dark level value corresponding to the first frame.

In an embodiment, the dark level corrector 300 may generate a final dark level value of each of the plurality of active regions based on the first dark data, the second dark data, and the temperature data. For example, the dark level corrector 300 may adjust a proportion of the first dark data and the second dark data for generating the final dark level value based on the temperature data.

In one embodiment, the image sensor 10 may further include an image signal processor configured to perform image processing on the image data IDT. For example, the image signal processor may perform image processing such as noise reduction processing, gain adjustment processing, waveform shaping processing, interpolation processing, white balance processing, gamma processing, edge enhancement processing, binning, etc. The image signal processor may perform bad pixel correction on the image data IDT.

Pixel values by bad pixels may be included in the image data IDT and the black data BDT. A bad pixel may refer to a pixel in which the pixel value difference from neighboring pixels is greater than or equal to a reference value or a pixel that does not have a pixel value corresponding to a specific gray level. The bad pixel may include static bad pixels continuously turned-on or turned-off and dynamic bad pixels randomly turned-on or turned-off among the plurality of pixels PX.

The image signal processor may perform bad pixel correction on the image data IDT and transfer, to the dark level corrector 300, the image data IDT on which the bad pixel correction has been performed. The dark level corrector 300 may perform dark level correction on the image data IDT on which the bad pixel correction has been performed.

The image signal processor may perform an image processing operation on the black data BDT. In an embodiment, the image signal processor may perform bad pixel correction on the black data BDT and transfer, to the dark level corrector 300, the black data BDT on which the bad pixel correction has been performed. The dark level corrector 300 may perform dark level correction on the image data IDT based on the black data BDT on which the bad pixel correction has been performed. For example, the dark level corrector 300 may generate first dark data using a heat transfer model generated based on black data BDT on which bad pixel correction has been performed, and correct image data IDT based on the first dark data.

In one embodiment, the image signal processor may perform bad pixel correction on the black data BDT. The image signal processor may correct pixel values of bad pixels among black pixel values included in the black data BDT. For example, the image signal processor may correct black pixel values of bad pixels using black pixel values of pixels around each of the bad pixels in the optical black pixel array 120. However, the method of correcting the bad pixel is not necessarily limited thereto.

The dark level corrector 300 may generate corrected image data IDTa on which the dark level correction of the image data IDT has been performed, based on the black data BDT. The corrected image data IDTa may be image data on which a dark level value is corrected in the image data IDT. The corrected image data IDTa may be provided to an external processor 20 (for example, a main processor or a graphic processor of an electronic device in which the image sensor 10 is mounted). The external processor 20 may perform image processing on the corrected image data IDTa to provide the corrected image data IDTa to a component that improves image quality or reduce resolution, stores image processed image data, displays corrected image data IDTa on a display, and/or performs an operation based on the image data.

In an embodiment, the pixel array 100, the readout circuit 200, and the dark level corrector 300 may be implemented as a single semiconductor chip or semiconductor module. In an embodiment, the pixel array 100 and the readout circuit 200 may be implemented as one semiconductor chip and the dark level corrector 300 may be implemented as another semiconductor chip.

The image sensor 10 according to the disclosure may correct a dark level of the image data IDT on a frame basis, and thus, the dark level may be estimated in real time and the estimation accuracy may be improved. In addition, because the image sensor 10 may accurately estimate a dark level value of the image data IDT based on the first dark data, the temperature data, and the second dark data, the image sensor 10 performs dark level correction of the image data based on the estimation, and thus, the quality of an image may be improved.

Figure 2:
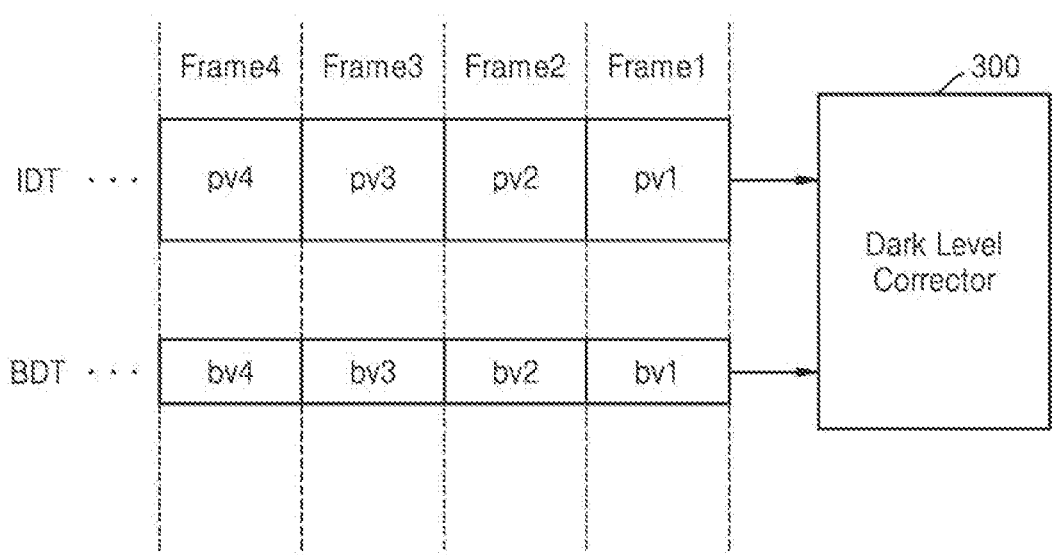
FIG. 2 is a diagram illustrating a dark level corrector that operates in units of frames according to an embodiment.

FIG. 2 is a diagram illustrating a dark level corrector 300 that operates in frame units according to an embodiment. The dark level corrector 300 of FIG. 2 may correspond to the dark level corrector 300 of FIG. 1, and repeated descriptions may be omitted.

Referring to FIG. 2, the image data IDT may include pixel values corresponding to each of a plurality of frames. For example, the image data IDT may include first pixel data pv1, second pixel data pv2, third pixel data pv3, and fourth pixel data pv4. The first pixel data pv1 may include pixel values corresponding to the first frame and may be pixel values constituting a first frame. The second pixel data pv2 may include pixel values corresponding to the second frame and may be pixel values constituting a second frame. The third pixel data pv3 may include pixel values corresponding to the third frame and may be pixel values constituting a third frame. The fourth pixel data pv4 may include pixel values corresponding to the fourth frame and may be pixel values constituting a fourth frame.

The black data BDT may include black pixel values corresponding to each of the plurality of frames. For example, the black data BDT may include first black pixel data bv1, second black pixel data bv2, third black pixel data bv3, and fourth black pixel data bv4. The first black pixel data bv1, the second black pixel data bv2, the third black pixel data bv3, and the fourth black pixel data bv4 may include black pixel values corresponding to each of the first frame, the second frame, the third frame, and the fourth frame.

The dark level corrector 300 may perform dark level correction on the image data IDT in frame units. The dark level corrector 300 may correct pixel values corresponding to each of the plurality of frames based on black pixel values of optical black pixels corresponding to each of the plurality of frames and that are included in a plurality of optical black regions. For example, the dark level corrector 300 may correct first pixel data pv1 based on the first black pixel data bv1. The dark level corrector 300 may estimate a dark level value of the first pixel data pv1 using a heat transfer model generated based on black pixel values of optical black pixels included in a plurality of optical black regions among the first black pixel data bv1 and generate first dark data based on the estimated dark level value. The dark level corrector 300 may correct pixel values of the first pixel data pv1 based on the first dark data. Hereinafter, as described above, pixel values may be described as being corrected in a frame-by-frame basis, but embodiments are not limited thereto.

Figure 3A:
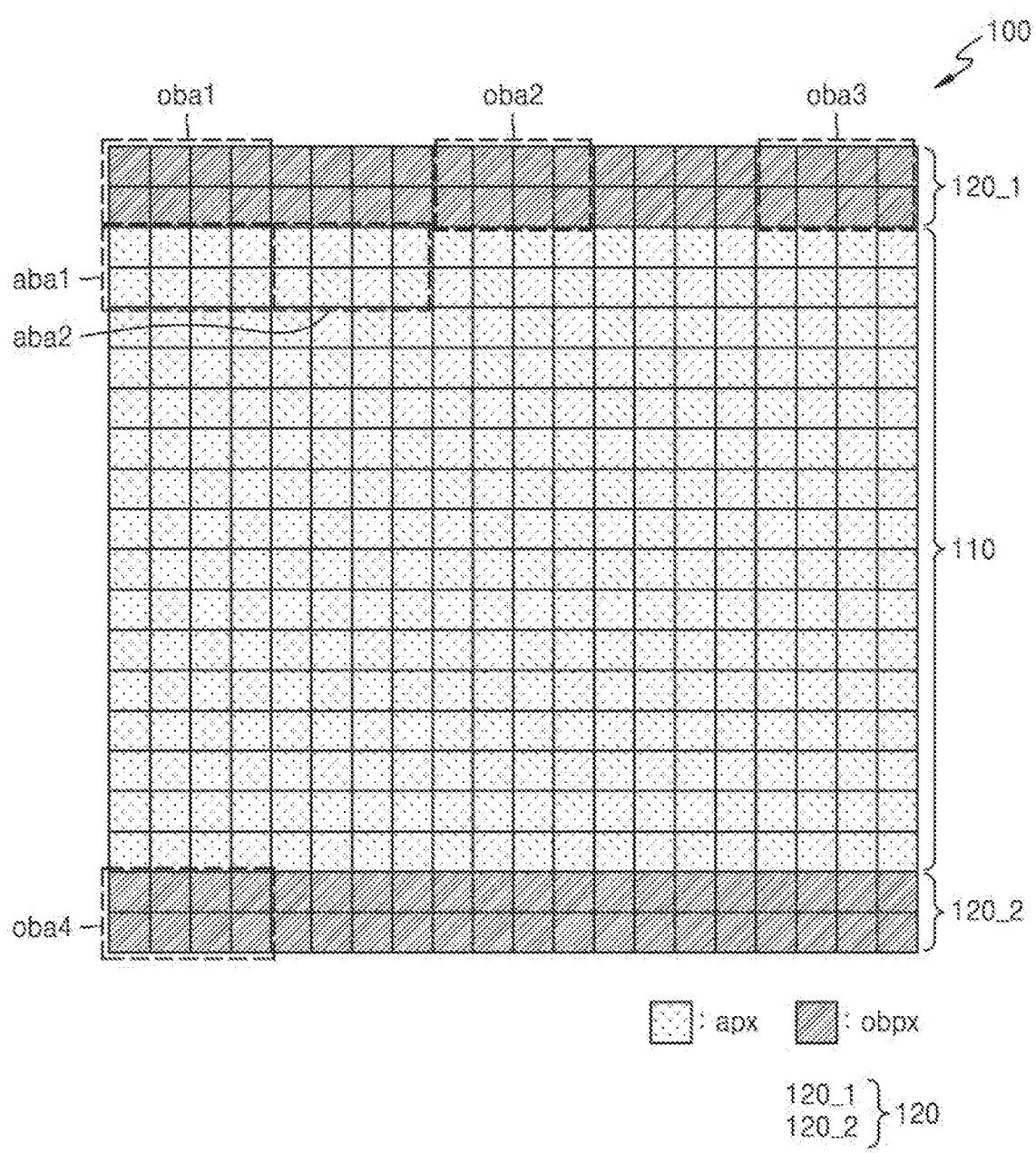
FIG. 3A is a diagram illustrating a pixel array according to an embodiment.

FIG. 3A is a diagram illustrating a pixel array 100 according to an embodiment. Referring to FIG. 3A, the pixel array 100 may include an active pixel array 110 and an optical black pixel array 120. Description of aspects similar to those described above may be omitted.

Referring to FIG. 3A, optical black pixels obpx may be disposed above and below active pixels apx. The optical black pixel array 120 may be classified into a first optical black pixel array 120_1 and a second optical black pixel array 120_2 according to positions in the pixel array 100. The first optical black pixel array 120_1 may be disposed above the active pixel array 110, and the second optical black pixel array 120_2 may be disposed below the active pixel array 110. The optical black pixel array 120 may include a plurality of optical black pixels obpx. The active pixel array 110 may include a plurality of active pixels apx. The number of pixels included in each of the optical black pixel array 120 and the active pixel array 110 is not limited to that shown in FIG. 3A, and various numbers of active pixels apx and optical black pixels obpx may be included.

The optical black pixel array 120 may include a plurality of optical black regions, and each of the plurality of optical black regions may include at least one optical black pixel obpx. In one embodiment, a partial region of the optical black pixel array 120 may be divided into a plurality of optical black regions. For example, the first optical black pixel array 120_1 may include a first optical black region oba1, a second optical black region oba2, and a third optical black region oba3. Some of the optical black pixels obpx included in the first optical black pixel array 120_1 may be included in the optical black region. Although in FIG. 3A it is depicted that each optical black region includes 8 optical black pixels obpx, this is only an example, and each optical black region may include one or more optical black pixels obpx.

The active pixel array 110 may include a plurality of active regions, and each of the plurality of active regions may include at least one active pixel apx. For example, the active pixel array 110 may be divided into a plurality of active regions each including a specific number of active pixels apx. For example, the active pixel array 110 may include a first active region aba1 and a second active region aba2. Although in FIG. 3 it is depicted that each active region includes 8 active pixels apx, this is only an example, and each active region may include one or more active pixels apx.

In one embodiment, the plurality of optical black regions may be set based on a plurality of active regions. For example, one optical black region may include the same number of optical black pixels obpx as the number of active pixels apx included in one active region. For example, the horizontal size of the optical black region may be the same as the horizontal size of the active region.

A dark level corrector (e.g., the dark level corrector 300 of FIG. 1) may correct pixel values of the active pixels included in the plurality of active regions based on the black pixel values of the optical black pixels obpx included in the plurality of optical black regions. For example, the dark level corrector 300 may correct pixel values of the active pixels apx included in the first active region aba1 based on the black pixel values of the optical black pixels obpx included in the first optical black region oba1.

The dark level corrector 300 may estimate dark level values of the active pixels apx included in the first active region aba1. For example, the dark level corrector 300 may estimate the dark level value included in each pixel value of the active pixels apx included in the first active region aba1 to be the same value.

The dark level corrector 300 may estimate a dark level value included in each pixel value of the active pixels apx included in the first active region aba1 using a heat transfer model generated based on the black pixel values of the optical black pixels obpx included in the first optical black region oba1 and generate first dark data.

In FIG. 3A, although it has been described that the first dark data for the first active region aba1 is generated based on the black pixel values of the first optical black region oba1, the first dark data for the first active region aba1 may be generated based on the black pixel values of the first optical black region oba1 and the fourth optical black region oba4, but embodiments are not necessarily limited to the above example.

Figure 3B:
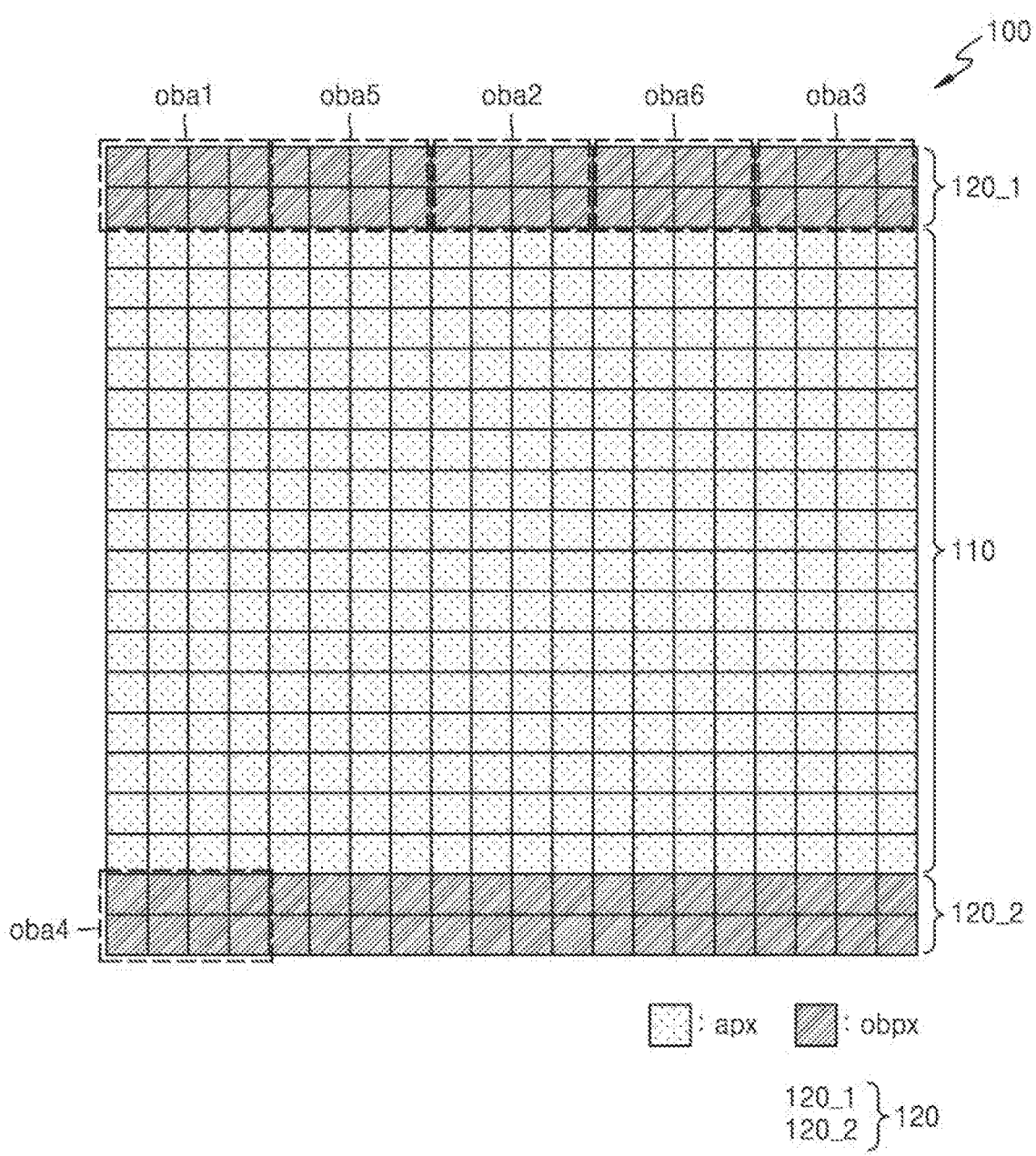
FIG. 3B is a diagram illustrating a pixel array according to an embodiment.

FIG. 3B is a diagram illustrating a pixel array 100 according to an embodiment. Description of aspects similar to those described above may be omitted.

Referring to FIG. 3B, the optical black pixels obpx may be disposed above and below the active pixels apx. The first optical black pixel array 120_1 may be disposed above the active pixel array 110, and the second optical black pixel array 120_2 may be disposed below the active pixel array 110.

The optical black pixel array 120 may include a plurality of optical black regions, and each of the plurality of optical black regions may include at least one optical black pixel obpx.

In one embodiment, all regions of the optical black pixel array 120 may be divided into a plurality of optical black regions. For example, the first optical black pixel array 120_1 may include a first optical black region oba1, a second optical black region oba2, a third optical black region oba3, a fifth optical black region oba5, and a sixth optical black region oba6. All optical black pixels obpx included in the first optical black pixel array 120_1 may be included in the optical black region.

Figure 3C:
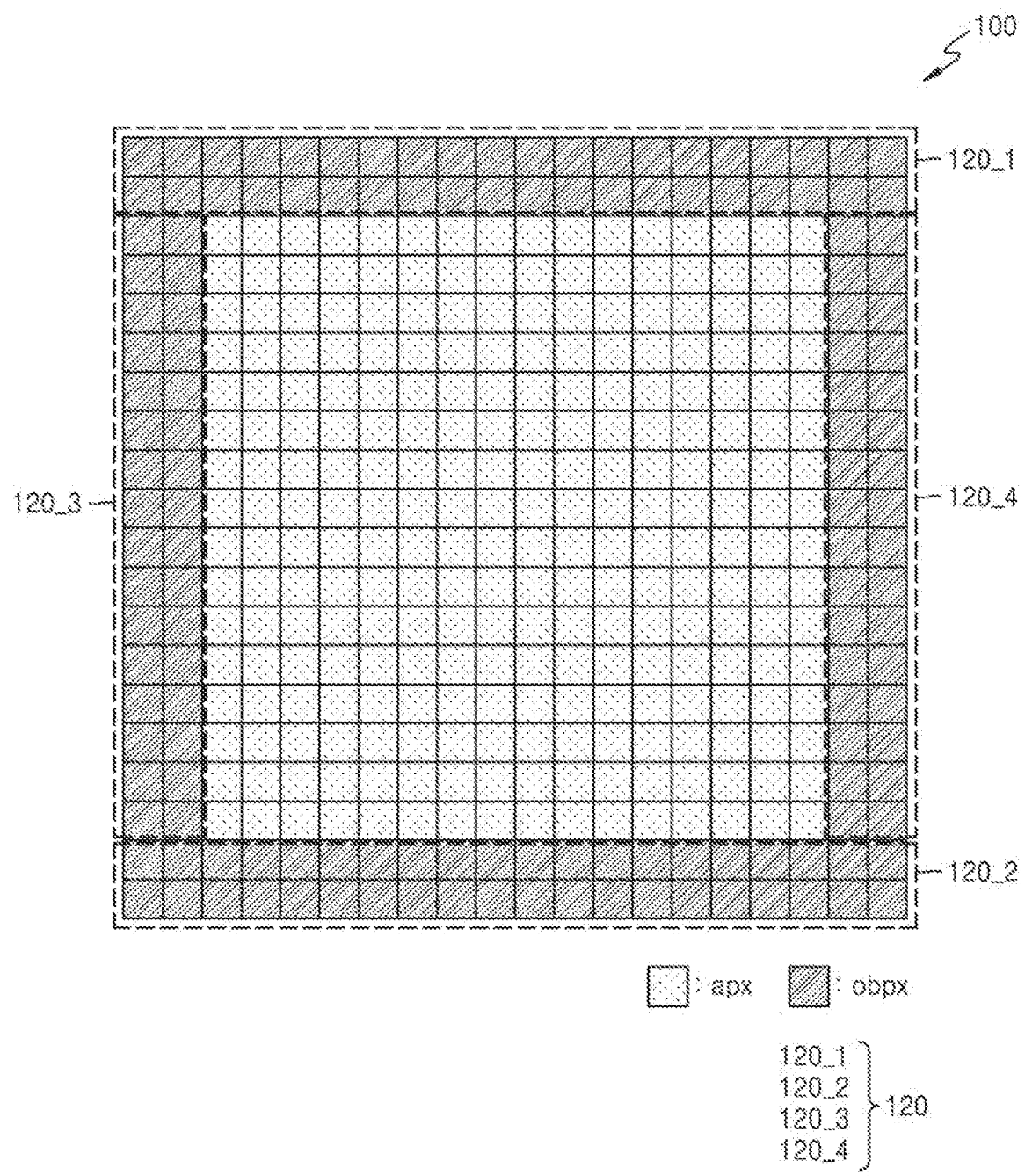
FIG. 3C is a diagram illustrating an arrangement of optical black pixels on upper, lower, left and right sides of an active pixel array according to an embodiment.

FIG. 3C is a diagram illustrating the arrangement of optical black pixels on the upper, lower, left and right sides of an active pixel array according to an embodiment. Description of aspects similar to those described above may be omitted.

Referring to FIG. 3C, the optical black pixels obpx may be disposed on upper and lower ends and left and right sides of the active pixels apx. The first optical black pixel array 120_1 may be disposed above the active pixel array 110, and the second optical black pixel array 120_2 may be disposed below the active pixel array 110. The third optical black pixel array 120_3 may be disposed on the left side of the active pixel array 110, and the fourth optical black pixel array 120_4 may be disposed on the right side of the active pixel array 110.

The optical black pixel array 120 may include a plurality of optical black regions, and each of the plurality of optical black regions may include at least one optical black pixel obpx.

Figure 4:
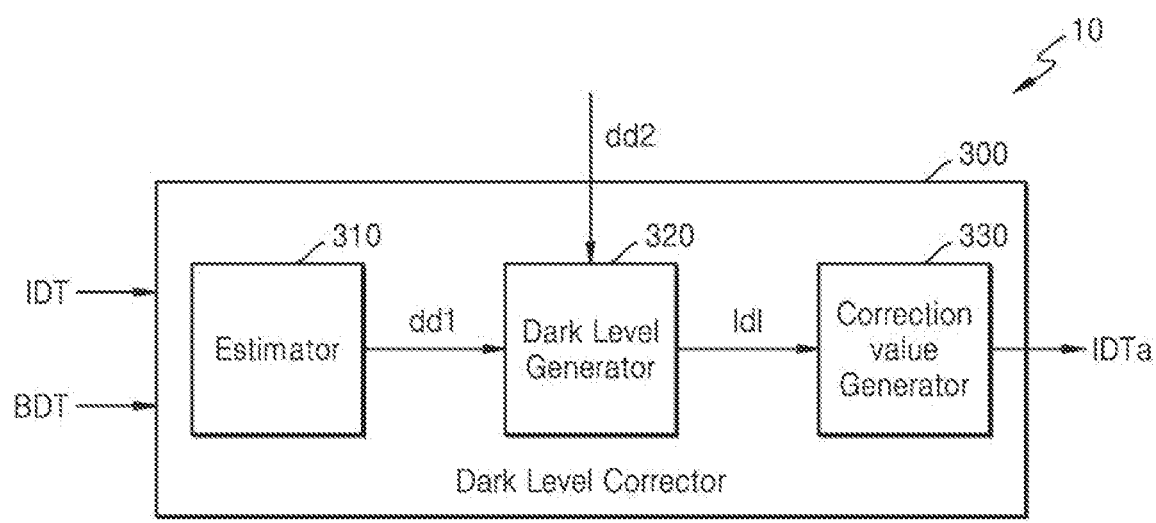
FIG. 4 is a block diagram illustrating a dark level corrector according to an embodiment.

FIG. 4 is a block diagram illustrating a dark level corrector 300 according to an embodiment. The dark level corrector 300 of FIG. 4 may correspond to the dark level corrector 300 of FIG. 1. Description of aspects similar to those described above may be omitted.

Referring to FIG. 4, the dark level corrector 300 may include an estimator 310, a dark level generator 320, and a correction value generator 330. The estimator 310 may correct pixel values corresponding to each of a plurality of frames using a heat transfer model generated based on black pixel values of optical black pixels included in a plurality of optical black regions. The estimator 310 may estimate a dark level value included in the pixel values of the first frame using a heat transfer model generated based on the black pixel values of the first frame and generate first dark data based on the estimated dark level value. The heat transfer model may be implemented based on a heat equation.

For example, the heat transfer model may be implemented based on the Equation (1).

$$\frac{\partial^2 T}{\partial x^2} + \frac{\partial^2 T}{\partial y^2} + \frac{q}{k} = 0 \tag{1}$$

In Equation (1), T indicates temperature and may be expressed as a function of a black pixel value. q may denote heat flux density and k may denote material conductivity. x may denote a coordinate in the x direction in the pixel array, and y may denote a coordinate in a y direction in the pixel array.

The estimator 310 may estimate a dark level value of each active region of the first frame using a heat transfer model generated based on black pixel values of the first frame. The dark level value of the active region may denote dark level values of active pixels included in each active region, and the dark level values of active pixels included in the same active region may be the same as the dark level value of the active region. The estimator 310 may estimate dark level values of active pixels included in each active region of the first frame using a heat transfer model. For example, the estimator 310 may generate first dark data dd1 by estimating the dark level value of each of the active pixels included in the first active region as a first dark level value and the dark level value of each of the active pixels included in the second active region as a second dark level value.

In an embodiment, the estimator 310 may generate a representative value of each of a plurality of optical black regions and generate the first dark data dd1 based on the representative value of each of a plurality of optical black regions. The estimator 310 may generate the first dark data dd1 by estimating the dark level value of each of the plurality of active regions based on the representative value of each of the plurality of optical black regions. The representative value may be generated based on at least one of pixel values of optical black pixels included in each of the plurality of optical black regions. The representative values will be described later in detail with reference to FIG. 5.

The dark level generator 320 may receive the first dark data dd1 from the estimator 310. The dark level generator 320 may receive second dark data dd2. The dark level generator 320 may generate a final dark level value ldl of each of the plurality of active regions based on at least one of the first dark data dd1 and the second dark data dd2. The dark level generator 320 may generate the final dark level value ldl included in pixel values of the first frame. The dark level generator 320 may generate the final dark level value ldl of each of the plurality of active regions. The second dark data dd2 may represent a dark level value included in the image data IDT at a specific temperature and may be referred to as calibration information. The second dark data dd2 may be received from external sources or may be pre-stored in an internal memory of the image sensor.

The dark level generator 320 may adjust weights of each of the first dark data dd1 and the second dark data dd2 to generate the final dark level value ldl. For example, the dark level generator 320 may adjust weights of the first dark data dd1 and the second dark data dd2 based on temperature data. The dark level generator 320 may generate the final dark level value ldl of each of the plurality of active regions. An operation of the dark level generator 320 will be described later in detail with reference to FIGS. 8 to 10.

The correction value generator 330 may generate a correction value based on the final dark level value. In an embodiment, the correction value generator 330 may receive a final dark level value of each active region of the first frame. The correction value generator 330 may generate a correction value for each active region for correcting a final dark level value of each active region of the first frame. The correction value generator 330 may generate a correction value for correcting a pixel value of each active pixel based on the correction value of each active region. The correction value generator 330 may correct pixel values of the first frame based on the correction value of each active pixel.

In an embodiment, the correction value generator 330 may generate a final dark level value included in each of the pixel values of the first frame based on the final dark level value of each active region of the first frame. The correction value generator 330 may generate a correction value for correcting a final dark level value of each of the active pixels of the first frame. The correction value generator 330 may correct pixel values of the first frame based on the correction value of each active pixel.

Figure 5:
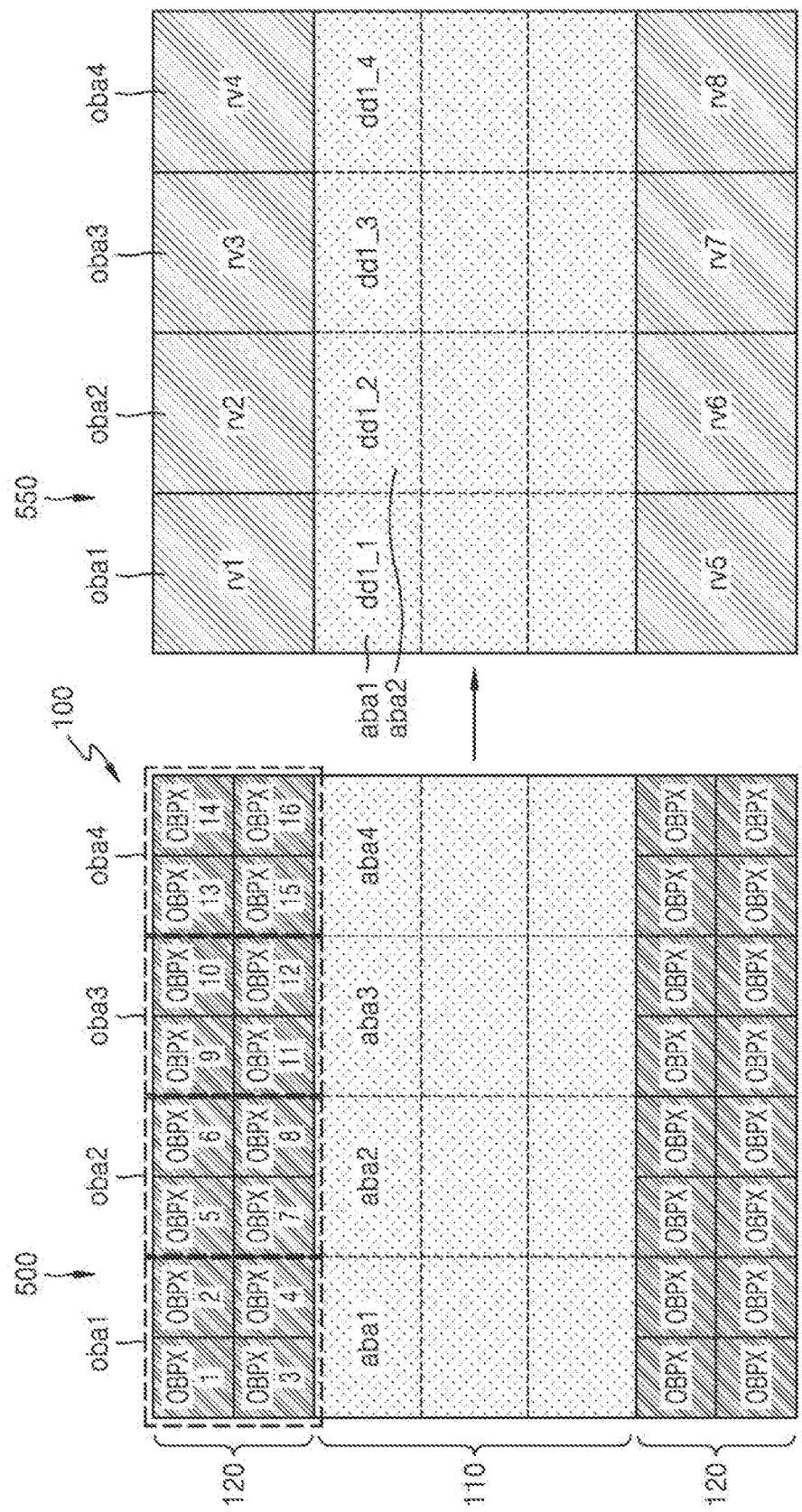
FIG. 5 is a diagram illustrating a method of generating a representative value, according to an embodiment.

FIG. 5 is a diagram illustrating a method of generating a representative value, according to an embodiment. Specifically, the estimator 310 of FIG. 4 may generate a representative value of each of a plurality of optical black regions. Diagram 500 shows the pixel array 100, and diagram 550 shows representative values and first dark data corresponding to the pixel array 100.

Referring to FIG. 5, the optical black pixel array 120 may include a plurality of optical black regions. For example, the optical black pixel array 120 includes a first optical black region oba1, a second optical black region oba2, a third optical black region oba3, and a fourth optical black region oba4.

The estimator 310 may generate a representative value of each of the plurality of optical black regions based on at least one black pixel value among black pixel values of optical black pixels included in each of the plurality of optical black regions. For example, the first optical black region oba1 may include a first optical black pixel obpx1, a second optical black pixel obpx2, a third optical black pixel obpx3, and a fourth optical black pixel obpx4. The estimator 310 may generate a representative value of the first optical black region oba1 based on at least one of black pixel values of each of a first optical black pixel obpx1, a second optical black pixel obpx2, a third optical black pixel obpx3, and a fourth optical black pixel obpx4. The estimator 310 may generate a representative value of the first optical black region oba1 as the first representative value rv1.

The second optical black region oba2 may include a fifth optical black pixel obpx5, a sixth optical black pixel obpx6, a seventh optical black pixel obpx7, and an eighth optical black pixel obpx8. The estimator 310 may generate a representative value of the second optical black region oba2 based on at least one of black pixel values of the fifth optical black pixel obpx5, the sixth optical black pixel obpx6, the seventh optical black pixel obpx7, and the eighth optical black pixel obpx8. The estimator 310 may generate a representative value of the second optical black region oba2 as the second representative value rv2.

In an embodiment, the representative value of each of the plurality of optical black regions may be an average value of black pixel values of the optical black pixels included in each of the plurality of optical black regions. For example, the estimator 310 may generate an average value of black pixel values of the first optical black pixel obpx1, the second optical black pixel obpx2, the third optical black pixel obpx3, and the fourth optical black pixel obpx4 as a representative value of the first optical black region oba1. For example, the estimator 310 may generate an average value of black pixel values of the fifth optical black pixel obpx5, the sixth optical black pixel obpx6, the seventh optical black pixel obpx7, and the eighth optical black pixel as a representative value of the second optical black region oba2.

The estimator 310 may generate first dark data based on the representative value of each of the plurality of optical black regions. For example, the estimator 310 may estimate a dark level value of the first active region aba1 based on the first representative value rv1 and generate first dark data dd1_1. The first active region aba1 may include at least one active pixel. The estimator 310 may generate the first dark data dd1_1 by estimating a dark level value of each of the active pixels included in the first active region aba1. The estimator 310 may estimate a dark level value of the second active region aba2 based on the second representative value rv2 and generate first dark data dd1_2.

FIG. 6 is a diagram illustrating first dark data according to an embodiment. Specifically, FIG. 6 shows representative values and first dark data. Description of aspects similar to those described above may be omitted.

The pixel array may include an optical black pixel array and an active pixel array. The optical black pixel array may include a plurality of optical black regions, and the active pixel array may include a plurality of active regions. For example, the optical black pixel array may include 20 optical black regions and the active pixel array may include 100 active regions. However, the numbers of optical black regions and active regions are not necessarily limited thereto.

Referring to FIG. 6, a representative value of the first optical black region may be a representative value rv1. A representative value of the second optical black region may be a second representative value rv2. A representative value of the 11th optical black region may be an 11th representative value rv11, and a representative value of the 12th optical black region may be a 12th representative value rv12.

The dark level corrector may generate first dark data dd1 based on the representative values of each of the plurality of optical black regions. For example, the dark level corrector may generate first dark data dd1_1 by estimating a dark level value included in pixel values of the first active region based on the first representative value rv1. The dark level corrector may generate first dark data dd1_1 based on the first representative value rv1 and a distance between the first optical black region and the first active region. The dark level corrector may estimate the dark level value of the first active region to be 41.9. For example, the dark level corrector may estimate all dark level values included in a pixel value of each of the active pixels of the first active region to be 41.9. As another example, the dark level corrector may generate first dark data dd1_1 by estimating a dark level value included in pixel values of the first active region based on the first representative value rv1 and the eleventh representative value rv11.

The dark level corrector may generate first dark data dd1_2 by estimating a dark level value included in pixel values of the second active region based on the second representative value rv2. The dark level corrector may generate first dark data dd1_2 based on the second representative value rv2 and a distance between the second optical black region and the second active region. The dark level corrector may estimate all dark level values of the second active region to be 52.7. As another example, the dark level corrector may generate the first dark data dd1_2 by estimating the dark level value included in pixel values of the second active region based on the second representative value rv2 and the twelfth representative value rv12.

Figure 7:
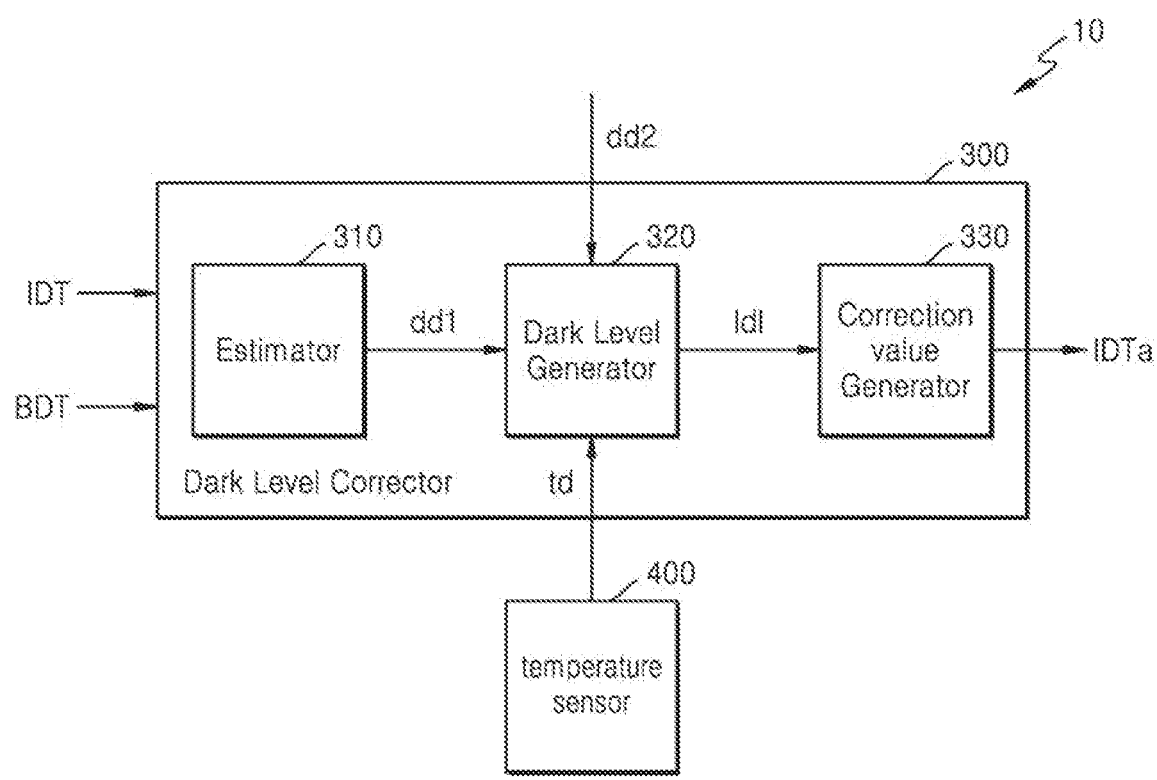
FIG. 7 is a diagram illustrating temperature data according to an embodiment.

FIG. 7 is a diagram illustrating temperature data according to an embodiment. Because the dark level corrector 300 of FIG. 7 may correspond to the dark level corrector 300 of FIG. 4, descriptions already given with reference to FIG. 4 may be omitted.

Referring to FIG. 7, the image sensor 10 may include the dark level corrector 300. The image sensor 10 may further include a temperature sensor 400. The temperature sensor 400 may generate temperature data td by measuring the temperature of at least a partial region of the image sensor 10. The temperature data td may be the temperature of the entire image sensor 10 or the temperature of each of a plurality of regions of the image sensor 10.

The dark level generator 320 may receive first dark data dd1, second dark data dd2, and temperature data td. In an embodiment, the dark level generator 320 may generate a final dark level value ldl based on the first dark data dd1, the second dark data dd2, and the temperature data td. The dark level generator 320 may generate a final dark level value ldl of each of the plurality of active regions based on the first dark data dd1, the second dark data dd2, and the temperature data td.

The dark level generator 320 may adjust weights of the first dark data dd1 and the second dark data dd2 to generate the final dark level value ldl based on the temperature data td. The image sensor 10 according to an embodiment may accurately estimate a dark level value even under various temperature conditions by estimating the final dark level value ldl based on the first dark data dd1, the second dark data dd2, and the temperature data td. Accordingly, the dark level correction of the image data IDT may further be improved and image quality may be improved. The operation of the dark level generator 320 will be described in detail with reference to FIGS. 8 and 9 below.

Figure 8:
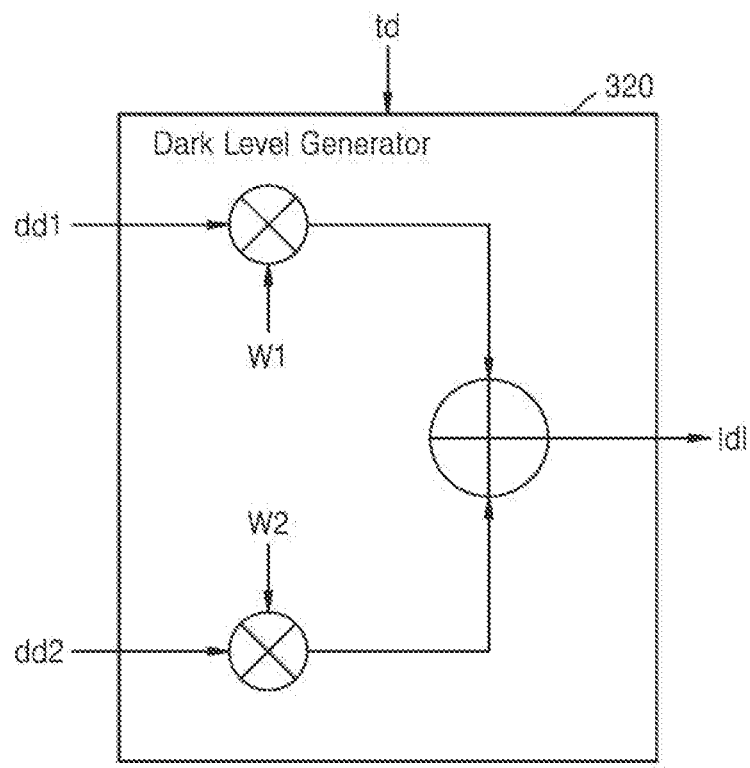
FIG. 8 is a diagram illustrating an operation of a dark level generator according to an embodiment.

FIG. 8 is a diagram illustrating an operation of the dark level generator 320 according to an embodiment. Description of aspects similar to those described above may be omitted.

Referring to FIG. 8, the dark level generator 320 may receive temperature data td. The dark level generator 320 may generate a final dark level value of each of the plurality of active regions based on the first dark data dd1 and the second dark data dd2. The dark level generator 320 may adjust weights of the first dark data dd1 and the second dark data dd2 to generate a final dark level value ldl based on the temperature data td.

The dark level generator 320 may calculate a first weight w1 and a second weight w2 based on the temperature data td. In an embodiment, the dark level generator 320 may generate a first weight w1 and a second weight w2 based on the temperature data td and generate the final dark level value ldl by applying the first weight w1 to the first dark data dd1 and the second weight w2 to the second dark data dd2. The dark level generator 320 may calculate a weighted average based on the first dark data dd1, the first weight w1, the second dark data dd2, and the second weight w2 of the first active region, and a final dark level value ldl of the first active region may be generated.

The first weight w1 and the second weight w2 may be calculated according to the temperature difference between the temperature of the temperature data td and the temperature of the second dark data dd2. For example, when the temperature data td represents the current temperature of 40° C. and the second dark data dd2 is calibration information at 25° C., the dark level generator 320 may calculate the first weight w1 as 0.8 and the second weight w2 as 0.2. For example, when the temperature data td represents the current temperature of 25° C. and the second dark data dd2 is calibration information at 25° C., the dark level generator 320 may calculate the first weight w1 as 0 and the second weight w2 as 1. However, the above descriptions are examples for convenience of explanation, and the values of the temperature, the first weight w1, and the second weight w2 may vary.

Figure 9:
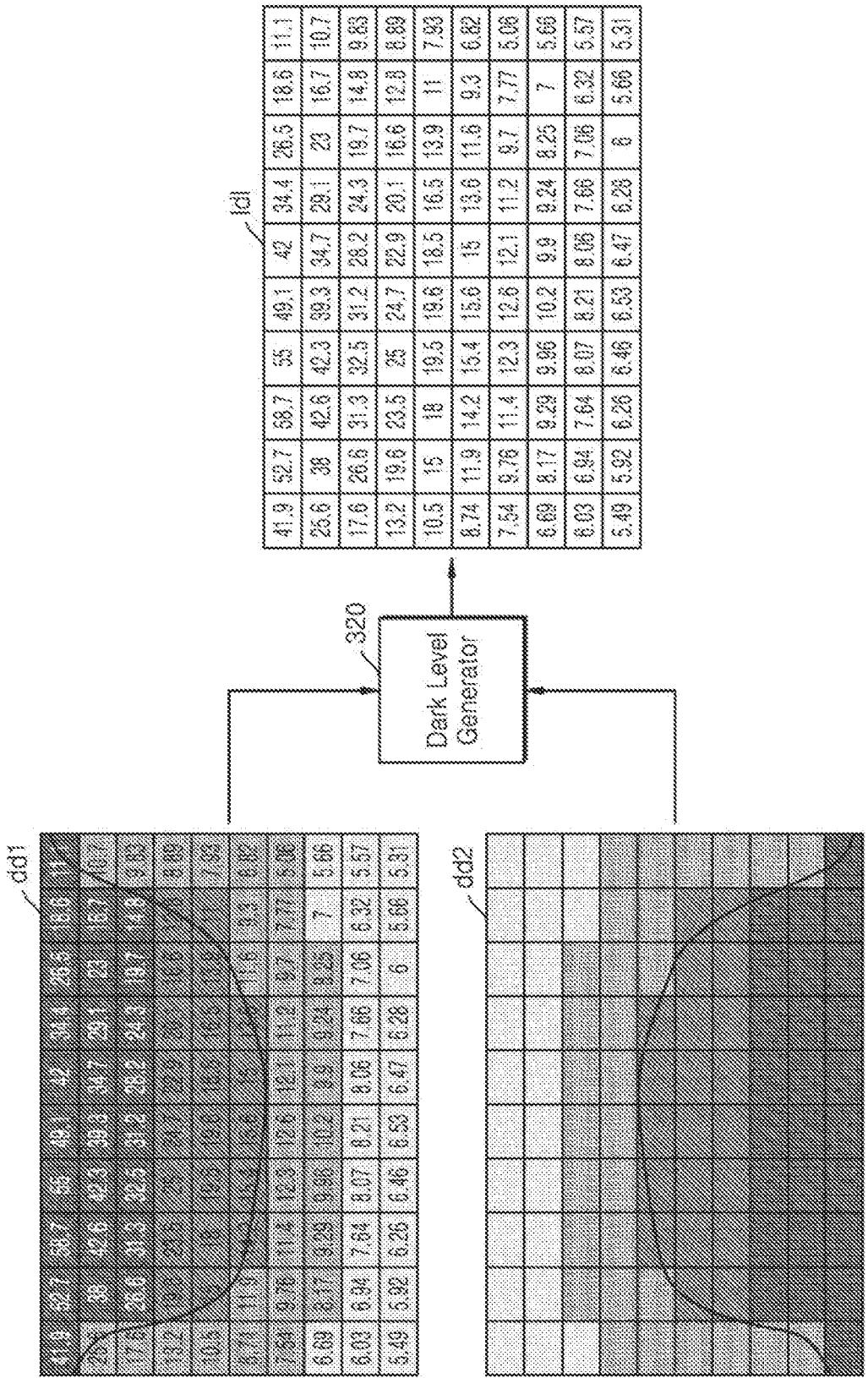
FIG. 9 is a diagram illustrating an operation of a dark level generator according to an embodiment.

FIG. 9 is a diagram illustrating an operation of a dark level generator according to an embodiment. FIG. 9 describes a method of generating a final dark level value using a guided filter. Description of aspects similar to those described above may be omitted.

The dark level generator 320 may generate a final dark level value of each of the plurality of active regions based on the first dark data dd1 and the second dark data dd2. The dark level generator 320 may generate a final dark level value based on a comparison between a first graph representing the distribution of the dark level values of the first dark data dd1 and a second graph representing the distribution of the dark level values of the second dark data dd2.

The dark level generator 320 may calculate a first weight w1 and a second weight w2 based on a comparison between the first graph and the second graph. For example, when the first graph and the second graph are similar to each other, the dark level generator 320 may calculate the first weight w1 and the second weight w2 as similar values.

For example, when the second graph is different from the first graph, the dark level generator 320 may calculate the second weight w2 as 0. For example, when the first graph is convex downward (i.e., concave) and the second graph is convex upward (i.e., convex), the dark level generator 320 may calculate the second weight w2 as 0. The dark level generator 320 may generate the first dark data dd1 as the final dark level value ldl.

Figure 10:
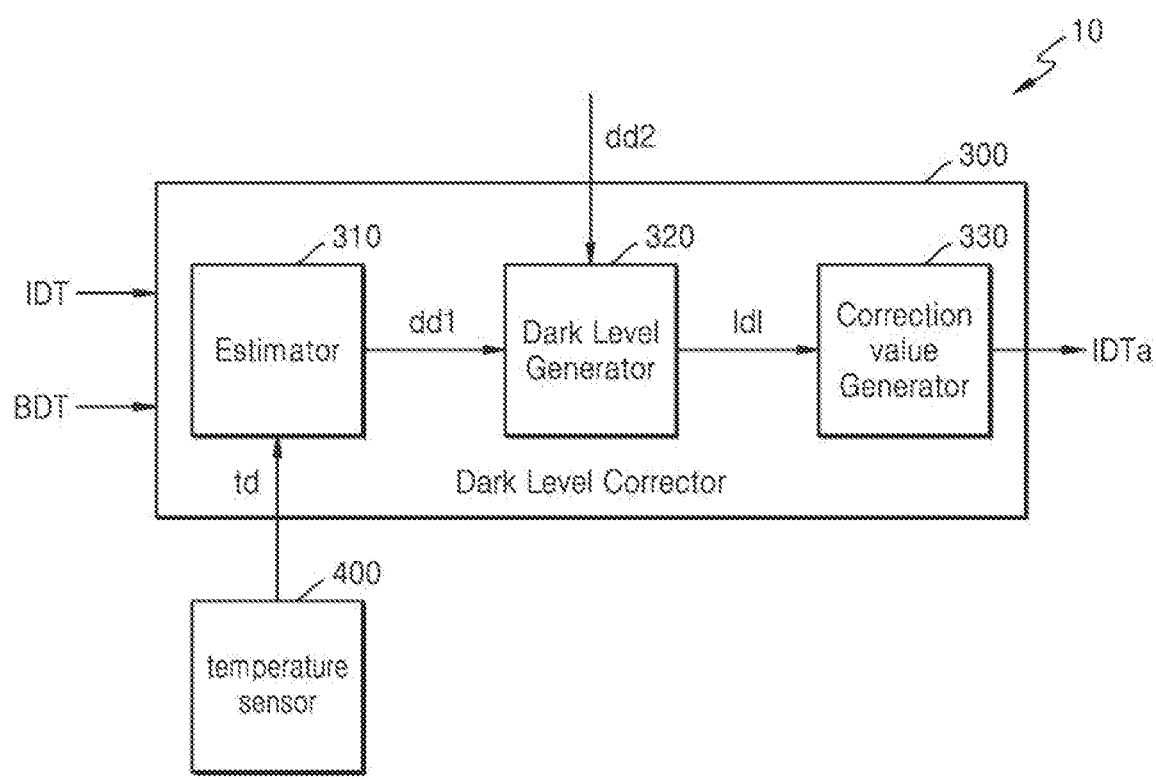
FIG. 10 is a diagram illustrating a dark level corrector according to an embodiment.

FIG. 10 is a diagram illustrating a dark level corrector 300 according to an embodiment. FIG. 10 illustrates an example where the estimator 310 generates first dark data based on the temperature data td.

Referring to FIG. 10, the image sensor 10 may include the dark level corrector 300. The image sensor 10 may further include a temperature sensor 400. The temperature sensor 400 may generate temperature data td by measuring the temperature of at least a partial region of the image sensor 10. The temperature data td may be a temperature of the entire image sensor 10 or a temperature of each of a plurality of regions of the image sensor 10.

The estimator 310 may receive temperature data td. In an embodiment, the estimator 310 may generate first dark data dd1 using a heat transfer model generated based on the temperature data td and black pixel values of optical black pixels included in the plurality of optical black regions. For example, the estimator 310 may change an initial condition of the heat transfer model based on the temperature data td and generate first dark data dd1 using a heat transfer model generated based on black pixel values of a plurality of optical black regions.

Figure 11:
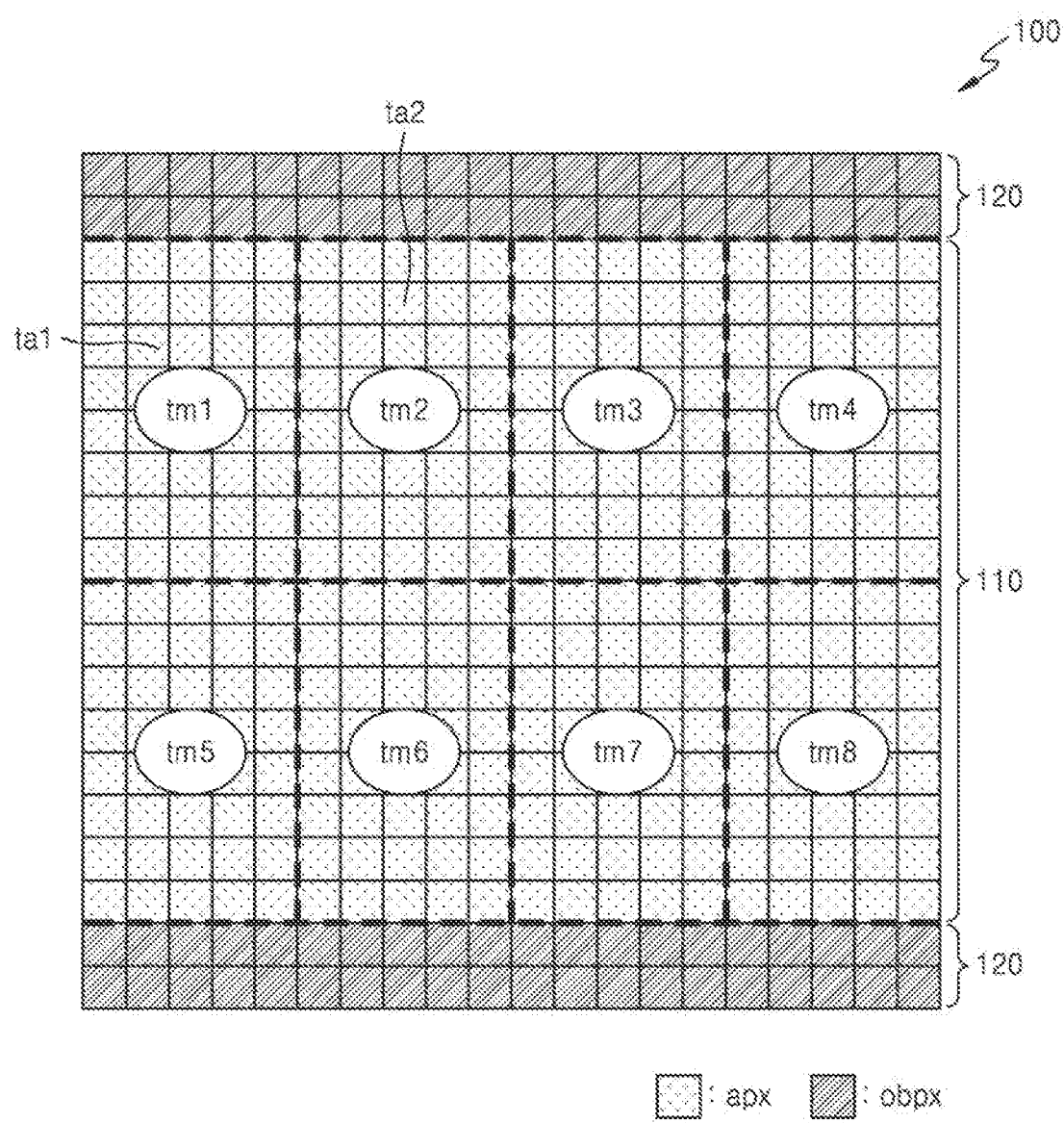
FIG. 11 is a diagram illustrating temperature data according to an embodiment.

FIG. 11 is a diagram illustrating temperature data according to an embodiment. Description of aspects similar to those described above may be omitted. Hereinafter, FIG. 10 and FIG. 11 are referred together.

The temperature data td may be a temperature of the entire image sensor 10 or a temperature of each of a plurality of regions of the image sensor 10. In one embodiment, the temperature data td may be a temperature for each of a plurality of temperature regions included in the active pixel array 110.

The temperature sensor 400 may include a plurality of temperature sensors tm (i.e., tm1 through tm8, although embodiments are not limited to 8 temperature sensors). Each of the plurality of temperature sensors tm may generate temperature data td by measuring the temperature of a temperature region corresponding to each of the plurality of temperature sensors. For example, the first temperature sensor tm1 may measure the temperature of a first temperature region ta1 corresponding to the first temperature sensor tm1. A second temperature sensor tm2 may measure the temperature of a second temperature region ta2 corresponding to the second temperature sensor tm2.

The estimator 310 may generate first dark data dd1 using a heat transfer model generated based on the temperature data td obtained by measuring the temperature of each of the plurality of temperature regions and the black data BDT.

An image sensor according to an embodiment may accurately estimate dark level values of pixel values using a current temperature of the image sensor and a heat transfer model, and thus improve the quality of image data by correcting the dark level of the pixel values based on the estimated dark level values.

Figure 12:
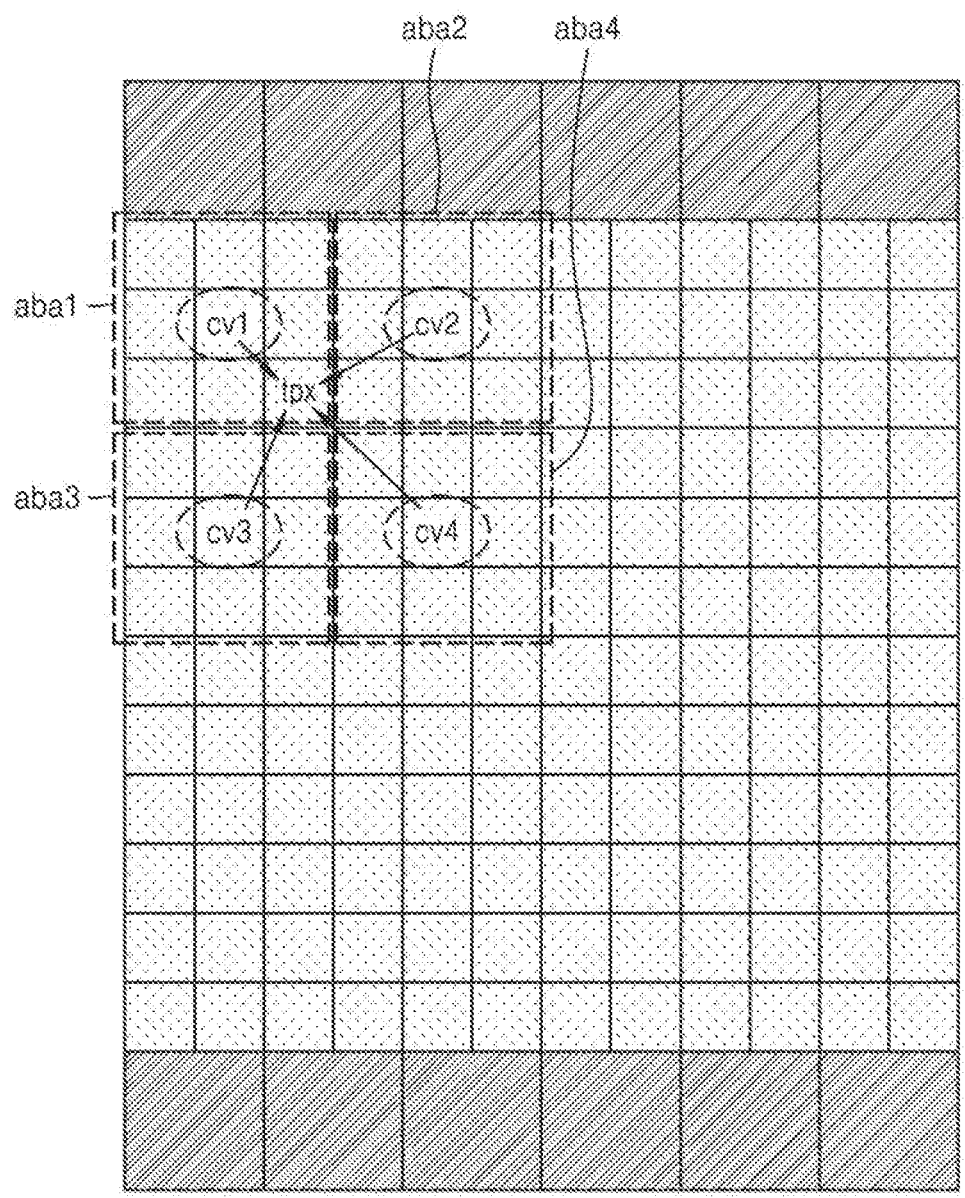
FIG. 12 is a diagram illustrating a method of generating a correction value according to an embodiment.

FIG. 12 is a diagram illustrating a method of generating a correction value, according to an embodiment. FIG. 12 is a diagram showing correction values corresponding to the pixel array 100.

The correction value generator 330 (e.g., the correction value generator 330 of FIG. 4) may generate a correction value based on a final dark level value. The correction value generator 330 may receive the final dark level value of each active region of the first frame. The correction value generator 330 may generate a correction value for each active region for correcting the final dark level value of each active region of the first frame. For example, the correction value of the active region may be a correction value of a pixel positioned in the center among active pixels included in each active region.

The correction value generator 330 may generate a correction value for correcting a pixel value of each active pixel based on the correction value of each active region. The correction value generator 330 may correct pixel values of the first frame based on the correction value of each active pixel. For example, the correction value generator 330 may perform dark level correction by subtracting the correction value of each active pixel from the pixel value of each active pixel.

In an embodiment, the correction value generator 330 may generate a correction value for correcting a pixel value corresponding to the target pixel tpx based on a final dark level value of at least one active region among the reference active regions. The target pixel tpx may denote an active pixel that is a target for dark level correction in the pixel array 100. The reference active regions may be active regions around the active region including the target pixel tpx. For example, the reference active regions may be active regions adjacent to the active region including the target pixel tpx. The correction value generator 330 may generate a correction value using an interpolation method. For example, the correction value generator 330 may generate the correction value of the target pixel tpx using a bilinear interpolation method.

The correction value generator 330 may generate a correction value for each of the active region including the target pixel tpx and the reference active regions and generate a correction value of the target pixel tpx by interpolating the correction value of each of the active region including the target pixel tpx and the reference active regions. For example, the target pixel tpx may be included in the first active region aba1. The reference active regions may be active regions around the first active region aba1. The reference active regions may include a second active region aba2, a third active region aba3, and a fourth active region aba4.

The correction value generator 330 may generate a first correction value cv1 of the first active region aba1 based on a final dark level value of the first active region aba1, generate a second correction value cv2 of the second active region aba2 based on a final dark level value of the second active region aba2, generate a third correction value cv3 of the third active region aba3 based on a final dark level value of the third active region aba3, and generate a fourth correction value cv4 of the fourth active region aba4 based on a final dark level value of the fourth active region aba4.

The correction value generator 330 may generate a correction value for correcting a pixel value of the target pixel tpx by interpolating the first correction value cv1, the second correction value cv2, the third correction value cv3, and the fourth correction value cv4. In FIG. 12, a method of generating a correction value of the target pixel tpx using the correction value of the active regions has been described, but is not necessarily limited thereto, and the correction value generator 330 may uses various methods to generate a correction value of the target pixel tpx.

For example, the correction value generator 330 may generate a final dark level value of the target pixel tpx based on the final dark level value of at least one active region among the reference active regions and generate a correction value of the target pixel tpx based on the final dark level value of the target pixel tpx. The correction value generator 330 may generate a final dark level value of the target pixel tpx by interpolating final dark level values of each of the active region including the target pixel tpx and the reference active regions and generate a correction value of the target pixel tpx based on the final dark level value of the target pixel tpx.

The image sensor according to an embodiment generates a correction value of the target pixel tpx using a final dark level value of each of the active region including the target pixel tpx and the reference active regions, and thus, even if pixel values of all pixels are not used, a correction value of the target pixel tpx may be generated. Accordingly, an amount of calculation for generating the correction value may be reduced, and the quality of the image may be improved.

Figure 13:
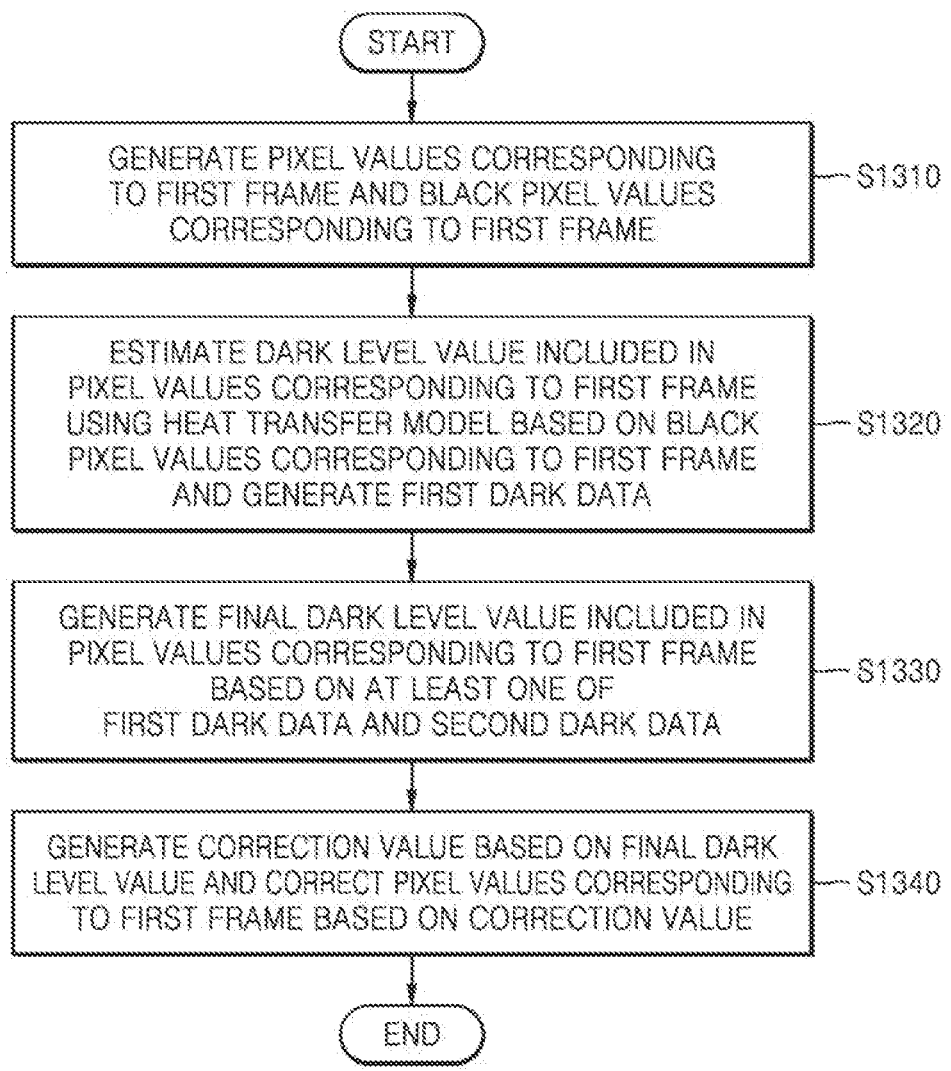
FIG. 13 is a flowchart illustrating a method of operating an image sensor according to an embodiment.

FIG. 13 is a flowchart illustrating a method of operating an image sensor according to an embodiment.

In operation S1310, the image sensor may generate pixel values corresponding to a first frame and black pixel values corresponding to the first frame. The image sensor may convert a pixel signal, which is an electrical signal, into image data including pixel values of each of a plurality of pixels.

The image data may include pixel values corresponding to each of a plurality of frames. The pixel values corresponding to the frame may refer to pixel values constituting the frame. The pixel values corresponding to the first frame may refer to pixel values constituting the first frame.

The pixel signal may include a signal including a dark current component. The dark current may refer to a current generated in a photoelectric conversion element of pixels in a state in which there is no incident light and is dependent on temperature. The pixel value may include a dark level value caused by a signal including a dark current component. The pixel values of active pixels may include a dark level value.

The image sensor may receive a black signal, which is an electrical signal, and convert the black signal into black data including black pixel values of each of a plurality of pixels. The image sensor may receive black signals from a plurality of optical black pixels and generate black data by converting the black signals into digital signals.

The black data may include black pixel values corresponding to each of a plurality of frames. The black pixel values corresponding to a frame may refer to black pixel values generated from optical black pixels when a pixel value corresponding to one frame is generated.

In operation S1320, the image sensor may generate first dark data. The image sensor may estimate a dark level value included in pixel values corresponding to the first frame using a heat transfer model generated based on black pixel values corresponding to the first frame and generate first dark data based on the estimated dark level value. The heat transfer model may refer to a model for estimating a dark level value of an active pixel by reflecting deterioration due to temperature.

In an embodiment, the image sensor may estimate a dark level value of each of the plurality of active regions using a heat transfer model generated based on black pixel values of the plurality of optical black regions. The image sensor may correct image data including pixel values based on the first dark data.

In an embodiment, the image sensor may generate first dark data using a heat transfer model generated based on black pixel values and temperature data of optical black pixels included in the plurality of optical black regions. The temperature data is a value obtained by measuring the temperature of at least a partial region of the image sensor, and may be a temperature of the entire image sensor or a temperature of each of a plurality of regions of the image sensor. For example, the temperature data may be a temperature for each of a plurality of temperature regions included in the active pixel array. For example, the image sensor may change an initial condition of the heat transfer model based on the temperature data and generate first dark data using the heat transfer model generated based on black pixel values corresponding to the first frame.

In operation S1330, the image sensor may generate a final dark level value. The image sensor may generate a final dark level value included in the pixel values corresponding to the first frame based on at least one of the first dark data and the second dark data. The second dark data may indicate a dark level value included in image data at a specific temperature through a test and may be referred to as calibration information.

In an embodiment, the image sensor may generate a final dark level value of each of the plurality of active regions based on the first dark data and the second dark data. The image sensor may correct image data based on the final dark level value and generate corrected image data. The image sensor may correct pixel values corresponding to the first frame based on a final dark level value of each of the plurality of active regions.

In an embodiment, the image sensor may generate a final dark level value of each of the plurality of active regions based on the first dark data, the second dark data, and the temperature data. For example, the image sensor may adjust a ratio of the first dark data and the second dark data to generate a final dark level value based on the temperature data.

In operation S1340, the image sensor may generate a correction value based on the final dark level value and correct pixel values corresponding to the first frame based on the correction value. The image sensor may generate a correction value for each active region based on the final dark level value of each active region. The image sensor may generate a correction value for each pixel value of the first frame based on a correction value for each active region. The image sensor may correct pixel values of the first frame using a correction value of each of the pixel values of the first frame.

Figure 14:
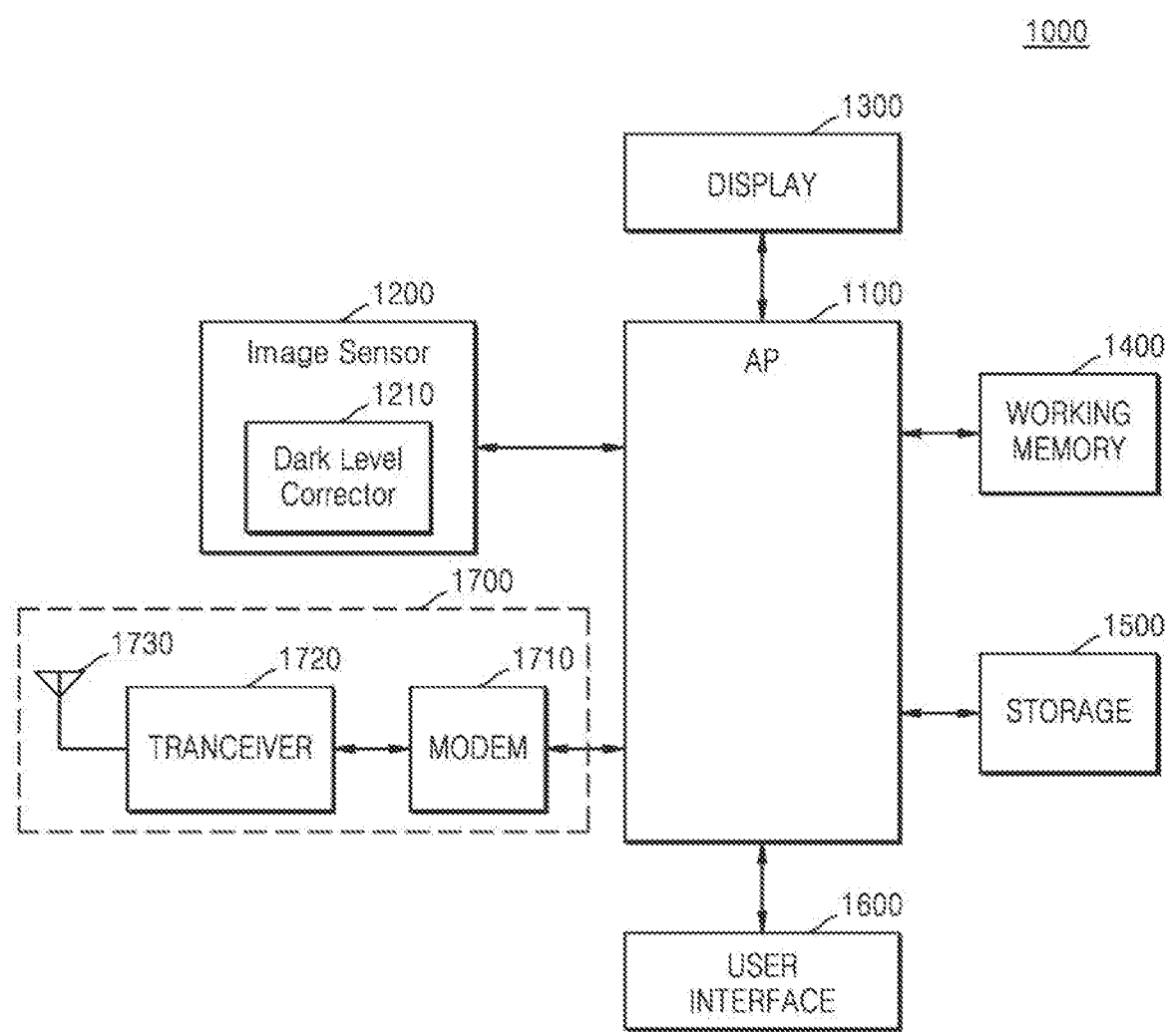
FIG. 14 is a block diagram illustrating an electronic device according to an embodiment.

FIG. 14 is a block diagram illustrating an electronic device 1000 according to an embodiment. For example, the electronic device 1000 may be a portable terminal.

Referring to FIG. 14, the electronic device 1000 according to an embodiment may include an application processor 1100, an image sensor 1200, a display 1300, a memory 1400, a storage 1500, a user interface 1600, and a wireless transceiver 1700. The descriptions of the image sensor 10 according to the embodiments illustrated in FIGS. 1 to 13 and the operation method thereof may be applied to the image sensor 1200.

The application processor 1100 may control an overall operation of the electronic device 1000 and may be provided as a system-on-chip (SoC) that drives application programs and an operating system.

The application processor 1100 may receive output data from the image sensor 1200.

The image sensor 1200 may generate image data based on the received light signal, and provide the image data to the application processor 1100. The image sensor 1200 may perform dark level correction. The image sensor 1200 may include a dark level corrector 1210.

The dark level corrector 1210 may correct pixel values corresponding to each of a plurality of frames on a frame-by-frame basis based on black pixel values of black pixels corresponding to each of a plurality of frames and included in a plurality of optical black regions.

The memory 1400 may be implemented as a volatile memory such as a dynamic random access memory (RAM) (DRAM) or a static RAM (SRAM) or a non-volatile resistive memory such as ferroelectric RAM (FeRAM), resistive RAM (RAM), phase-change RAM (PRAM), etc. The memory 1400 may store programs and/or data processed or executed by the application processor 1100.

The storage 1500 may be implemented as a non-volatile memory device such as an NAND flash or a resistive memory. For example, the storage 1500 may be provided as a memory card (MultiMediaCard (MMC), eMMC, secure digital (SD), or micro SD), etc. The storage 1500 may store data and/or programs for execution algorithms that control image processing operations of the image sensor 1200, and when an image processing operation is performed, the data and/or programs may be loaded to the memory 1400. In an embodiment, the storage 1500 may store output image data, for example, corrected image data or post-processed image data generated by the image sensor 1200.

The user interface 1600 may be implemented as various devices capable of receiving user input, such as a keyboard, a curtain key panel, a touch panel, a fingerprint sensor, and a microphone. The user interface 1600 may receive a user input and provide a signal corresponding to the received user input to the application processor 1100.

The wireless transceiver 1700 may include a transceiver 1720, a modem 1710, and an antenna 1730.

At least one of the devices, units, components, modules, units, or the like represented by a block or an equivalent indication in the above embodiments including but not limited to FIGS. 1, 2, 4, 7, 9, 10 and 14 may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein)

Each of the embodiments provided in the above description is not excluded from being associated with one or more features of another example or another embodiment also provided herein or not provided herein but consistent with the disclosure While the disclosure has been particularly shown and described with reference to embodiments thereof, it will be understood that various changes in form and details may be made therein without departing from the spirit and scope of the following claims.

What is claimed is:

1. An image sensor comprising:
   an active pixel array in which a plurality of active pixels are arranged in a matrix, the active pixel array comprising a plurality of active regions comprising at least one active pixel;
   an optical black pixel array in which a plurality of optical black pixels are arranged in a matrix, the optical black pixel array comprising a plurality of optical black regions comprising at least one optical black pixel;
   a readout circuit configured to:
      generate image data comprising pixel values by converting pixel signals generated from the plurality of active pixels into digital signals; and
      generate black data comprising black pixel values by converting black signals generated from the plurality of optical black pixels into digital signals; and
   a dark level corrector configured to correct pixel values included in the image data corresponding to each of a plurality of frames on a frame-by-frame basis based on black pixel values included in the black data of optical black pixels that correspond to each of the plurality of frames and that are included in the plurality of optical black regions by estimating a dark level value of each of the plurality of active regions by using a heat transfer model.

2. The image sensor of claim 1, wherein the dark level corrector is further configured to:
   generate first dark data based on the estimated dark level value; and
   correct pixel values the image data based on the first dark data.

3. The image sensor of claim 2, wherein the dark level corrector is further configured to:
   generate a representative value of each of the plurality of optical black regions based on at least one black pixel value among the black pixel values of the optical black pixels included in each of the plurality of optical black regions; and
   generate the first dark data based on the representative value of each of the plurality of optical black regions.

4. The image sensor of claim 3, wherein the representative value of each of the plurality of optical black regions comprises an average value of the black pixel values corresponding to the optical black pixels in each of the plurality of optical black regions.

5. The image sensor of claim 2, wherein the dark level corrector is further configured to:
   generate a final dark level value of each of the plurality of active regions based on the first dark data and second dark data indicating a dark level value included in image data at a specific temperature; and
   generate corrected image data based on the final dark level value.

6. The image sensor of claim 5, wherein the image sensor further includes a temperature sensor configured to generate temperature data by measuring a temperature of at least a partial region of the image sensor, and
   wherein the dark level corrector is further configured to generate the final dark level value based on the temperature data, the first dark data, and the second dark data.

7. The image sensor of claim 6, wherein the dark level corrector is further configured to generate the final dark level value by applying a first weight to the first dark data and a second weight to the second dark data based on the temperature data.

8. The image sensor of claim 6, wherein the dark level corrector is further configured to generate the final dark level value based on a comparison between a first shape representing a distribution of dark level values of the first dark data and a second shape representing a distribution of dark level values of the second dark data.

9. The image sensor of claim 5, wherein the dark level corrector is further configured to generate a correction value for correcting a pixel value corresponding to a target pixel and a dark level to be corrected in the active pixel array, based on a final dark level value of at least one active region among reference active regions, and
   wherein the reference active regions comprise active regions around an active region comprising the target pixel.

10. The image sensor of claim 2, wherein the image sensor further comprises at least one temperature sensor configured to generate temperature data by measuring a temperature of at least a partial region of the active pixel array,
    wherein the heat transfer model is generated based on the temperature data, and
    wherein the dark level corrector is further configured to generate the first dark data using the heat transfer model that is generated based on the temperature data and black pixel values.

11. The image sensor of claim 10, wherein the at least one temperature sensor comprises a plurality of temperature sensors, and
    wherein each of the plurality of temperature sensors is configured to generate temperature data by measuring a temperature of a respective plurality of temperature regions of the active pixel array.

12. The image sensor of claim 1, wherein the plurality of optical black regions are set based on the plurality of active regions.

13. An image sensor comprising:
    an active pixel array comprising a plurality of active pixels;
    an optical black pixel array comprising a plurality of optical black pixels;
    a readout circuit configured to:

generate pixel values corresponding to a first frame by converting pixel signals generated from the plurality of active pixels into digital signals; and generate black pixel values corresponding to the first frame by converting black signals generated from the plurality of optical black pixels into digital signals;

an estimator configured to:

estimate dark level values included in the pixel values corresponding to the first frame using a heat transfer model generated based on the black pixel values; and generate first dark data based on the estimated dark level values;

a dark level generator configured to:

generate a final dark level value based on at least one of the first dark data and second dark data indicating a dark level value included in a pixel value at a specific temperature; and a correction value generator configured to:

generate a correction value based on the final dark level value; and correct the pixel values corresponding to the first frame based on the correction value.

14. The image sensor of claim 13, wherein the dark level generator is further configured to:

receive temperature data from a temperature sensor configured to measure temperatures of at least a partial region of the image sensor; and generate the final dark level value based on the temperature data, the first dark data, and the second dark data.

15. The image sensor of claim 14, wherein the dark level generator is further configured to generate the final dark level value by applying a first weight to the first dark data and a second weight to the second dark data, and wherein the first weight and the second weight are calculated based on the temperature data.

16. The image sensor of claim 13, wherein the estimator is further configured to:

receive temperature data from a temperature sensor configured to measure a temperature of at least a partial region of the image sensor; and generate the first dark data using the heat transfer model and the temperature data.

17. The image sensor of claim 16, wherein the estimator is further configured to generate the first dark data based on temperature data obtained by measuring temperatures of each of a plurality of temperature regions included in the active pixel array and black pixel values corresponding to the first frame.

18. The image sensor of claim 13, wherein the optical black pixel array comprises a plurality of optical black regions comprising at least one optical black pixel, and wherein the estimator is further configured to generate the first dark data based on black pixel values of optical black pixels included in the plurality of optical black regions among the black pixel values corresponding to the first frame.

19. The image sensor of claim 18, wherein the estimator is further configured to:

generate a representative value of each of the plurality of optical black regions based on at least one black pixel value among the black pixel values of the optical black pixels included in the plurality of optical black regions; and generate the first dark data based on the representative value of each of the plurality of optical black regions.

20. A method of operating an image sensor comprising a plurality of active pixels and a plurality of optical black pixels, the method comprising:

generating pixel values corresponding to a first frame by converting pixel signals generated from the plurality of active pixels into digital signals;

generating black pixel values corresponding to the first frame by converting black signals generated from the plurality of optical black pixels into digital signals;

estimating dark level values of the pixel values corresponding to the first frame using a heat transfer model generated based on the black pixel values;

generating first dark data based on the estimated dark level values;

generating a final dark level value of the pixel values corresponding to the first frame based on at least one of the first dark data and second dark data indicating a dark level value included in image data at a specific temperature;

generating a correction value based on the final dark level value; and correcting the pixel values corresponding to the first frame based on the correction value.

* * * * *